US012682819B2

(12) United States Patent
Kim et al.

(10) Patent No.: US 12,682,819 B2
(45) **Date of Patent: *Jul. 14, 2026**

(54) DISPLAY DEVICE AND DRIVING METHOD THEREOF

(71) Applicant: SAMSUNG ELECTRONICS CO., LTD., Suwon-si (KR)

(72) Inventors: Minsung Kim, Suwon-si (KR); Seung-Hoon Baek, Suwon-si (KR); Choonghoon Lee, Suwon-si (KR); Jeong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/017,163

(22) Filed: Jan. 10, 2025

(65) Prior Publication Data

US 2025/0148958 A1 May 8, 2025

Related U.S. Application Data

(63) Continuation of application No. 18/636,934, filed on Apr. 16, 2024, now Pat. No. 12,236,839.

(30) Foreign Application Priority Data

Aug. 24, 2023 (KR) ........................ 10-2023-0111499

(51) Int. Cl.
*G09G 3/20* (2006.01)

(52) U.S. Cl.
CPC ..... *G09G 3/2092* (2013.01); *G09G 2310/027* (2013.01); *G09G 2310/0291* (2013.01); *G09G 2330/028* (2013.01)

(58) Field of Classification Search
CPC ........... G09G 3/2092; G09G 2310/027; G09G 2310/0291; G09G 2330/028
See application file for complete search history.

(56) References Cited

U.S. PATENT DOCUMENTS

| | | | |
|---|---|---|---|
| 7,948,482 | B2 | 5/2011 | Lee et al. |
| 8,810,268 | B2 | 8/2014 | Huang et al. |
| 9,772,514 | B2 | 9/2017 | Moon |
| 10,175,297 | B2 | 1/2019 | Cilek et al. |
| 10,339,895 | B2 | 7/2019 | Tai et al. |
| 11,508,280 | B2 | 11/2022 | Ichikura |
| 2010/0182299 | A1 | 7/2010 | Houdou et al. |

(Continued)

FOREIGN PATENT DOCUMENTS

| | | | |
|---|---|---|---|
| CN | 115148134 | A | 10/2022 |
| TW | 201721621 | A | 6/2017 |

*Primary Examiner* — Andrew Sasinowski
(74) *Attorney, Agent, or Firm* — Fish & Richardson P.C.

(57) ABSTRACT

A display device includes a pixel array including a plurality of pixels connected to a plurality of source lines, a voltage generator configured to generate a reference voltage, and a source driver configured to output a first source signal corresponding to a first source line among the plurality of source lines, receive a first return signal corresponding to the first source signal through a second source line positioned adjacent to the first source line, and generate a first count value based on a first comparison result of the first return signal and the reference voltage.

20 Claims, 13 Drawing Sheets

(56) References Cited

U.S. PATENT DOCUMENTS

| | | | | |
|---|---|---|---|---|
| 2011/0216052 | A1* | 9/2011 | Tanaka | G09G 3/3685 345/209 |
| 2012/0169368 | A1 | 7/2012 | Chen et al. | |
| 2016/0071463 | A1* | 3/2016 | Takahashi | H10K 59/1213 327/109 |
| 2018/0061307 | A1* | 3/2018 | Inoue | G09G 3/3275 |
| 2020/0027379 | A1* | 1/2020 | Kim | G01R 1/30 |
| 2023/0057575 | A1 | 2/2023 | Kim et al. | |

* cited by examiner

200

2000

DISPLAY DEVICE AND DRIVING METHOD THEREOF

CROSS-REFERENCE TO RELATED APPLICATION

This application is a continuation of U.S. application Ser. No. 18/636,934, filed Apr. 16, 2024, which claims priority to and the benefit of Korean Patent Application No. 10-2023-0111499 filed in the Korean Intellectual Property Office on Aug. 24, 2023, the entire contents of each are incorporated herein by reference.

BACKGROUND

With the development of information and communication technology, electronic devices such as electrics, smartphones, and artificial reality systems including display devices for delivering image information to users are rapidly developing. As the amount of data processed to provide image information increases, high-performance display devices are in demand.

A display device can generate and emit light using various elements. To improve the quality of images displayed by such display devices, a display driver integrated circuit (DDI) for displaying images on a display panel may perform various operations.

SUMMARY

The present disclosure relates to a display device and driving method thereof. In particular, the present disclosure covers display devices for measuring the output of a source line.

In general, in some aspects, the subject matter of this disclosure is directed to a display device including: a pixel array including a plurality of pixels connected to a plurality of source lines, a voltage generator configured to generate a reference voltage, and a source driver configured to output a first source signal corresponding to a first source line among the plurality of source lines, receive a first return signal corresponding to the first source signal through a second source line positioned adjacent to the first source line, and generate a first count value based on a first comparison result of the first return signal and the reference voltage.

In general, in some aspects, the subject matter of this disclosure is directed to a display device including: a pixel array including a plurality of pixels connected to a plurality of source lines, a voltage generator configured to generate a reference voltage, and a source driver configured to output a first source signal corresponding to a first source line among the plurality of source lines, receive a first return signal corresponding to the first source signal through a first return line among a plurality of return lines connected to each of the plurality of source lines, and generate a first count value based on a first comparison result of the first return signal and the reference voltage.

In general, in some aspects, the subject matter of this disclosure is directed to a display device including: a pixel array including a plurality of pixels connected to a plurality of source lines, a voltage generator configured to generate a reference voltage, and a source driver configured to output a first source signal corresponding to a first source line among the plurality of source lines, receive a first return signal corresponding to the first source signal through a first return line among a plurality of return lines connected each of the plurality of source lines, connected to the plurality of source lines and the plurality of return lines, and generate a first count value based on a first comparison result of the first return signal and the reference voltage.

DETAILED DESCRIPTION

Figure 1:
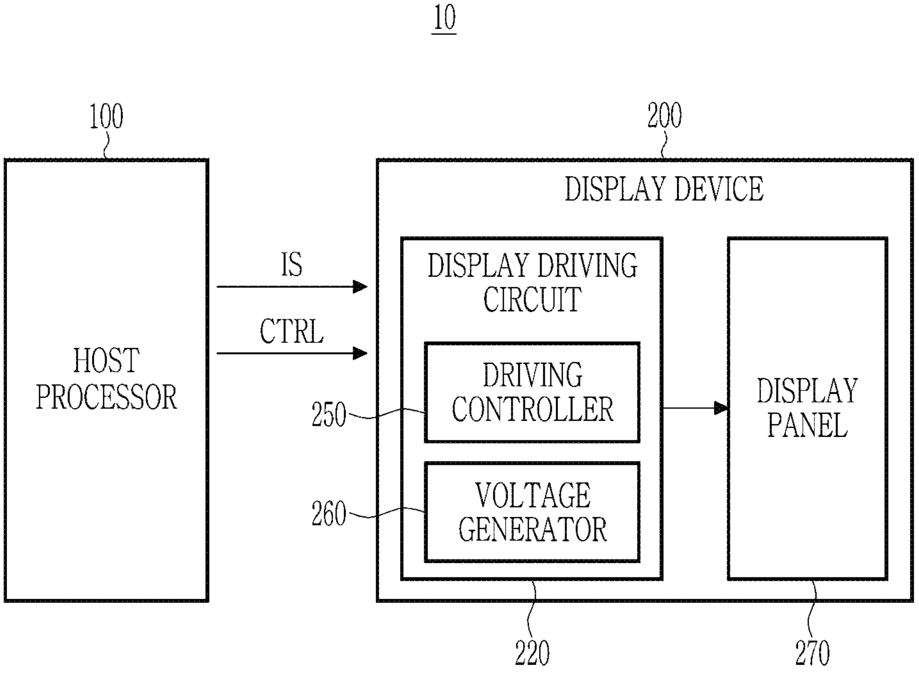
FIG. 1 is a block diagram showing an example of a display system.

Hereinafter, the present disclosure will be described in detail hereinafter with reference to the accompanying drawings, in which examples of the present disclosure are shown. As those skilled in the art would realize, the described examples may be modified in various different ways, all without departing from the spirit or scope of the present disclosure.

Accordingly, the drawings and description are to be regarded as illustrative in nature and not restrictive. Like reference numerals designate like elements throughout the specification. In the flowchart described with reference to drawings in this description, the operation order may be changed, several operations may be merged, certain operations may be divided, and specific operations may not be performed.

In the description, expressions described in the singular in this specification may be interpreted as the singular or plural unless an explicit expression such as “one” or “single” is used. Although terms of “first,” “second,” and the like are used to explain various constituent elements, the constituent elements are not limited to such terms. These terms are only used to distinguish one constituent element from another constituent element.

FIG. 1 is a block diagram showing an example of a display system.

For example, display system 10 includes an artificial reality system, such as a VR system, an AR system, a mixed reality (MR) system, a hybrid reality system, or some combination and/or derivative system thereof. Artificial reality systems may be implemented on a variety of platforms, including head mounted displays (HMD), mobile devices, computing systems, or other hardware platforms capable of providing artificial reality content to one or more viewers. In some implementations, the display system 10 may be mounted on an electronic device having an image display function. For example, electronic devices may include smartphones, tablet personal computers, portable multimedia players (PMPs), cameras, wearable devices, televisions, digital video disk (DVD) players, refrigerators, air conditioners, air purifiers, set-top boxes, robots, drones, various medical devices, navigation devices, global positioning system (GPS) receivers, vehicle devices, furniture, and various measuring devices.

Referring to FIG. 1, the display system 10 includes a host processor 100 and a display device 200. The display device 200 includes a display driving circuit 220 and a display panel 270.

The host processor 100 may generate an input image signal IS to be displayed on the display panel 270 and transmit the input image signal IS and a control command CTRL to the display driving circuit 220. The input image signal IS may include frame data corresponding to each frame. The control command CTRL may include setting information about luminance, gamma, frame frequency, and operation mode of the display driving circuit 220. For example, the operating mode may include a driving mode and a test mode including a DC level measurement mode and a slew rate measurement mode. Here, the slew rate may be a parameter indicating the operating speed of the OP Amp and may indicate the degree to which the output voltage can change per unit time.

The host processor 100 may be a graphics processor. However, the present disclosure is not limited thereto, and the host processor 100 may be implemented with various types of processors, such as a central processing unit (CPU), microprocessor, multimedia processor, and application processor. In some implementations, the host processor 100 may be implemented as an integrated circuit (IC) or system on chip (SoC).

The display device 200 may receive the input image signal IS from the host processor 100 and display the input image signal IS. The display device 200 may display a two-dimensional or three-dimensional image to the user. In some implementations, the display device 200 may be a device in which the display driving circuit 220 and the display panel 270 are implemented as a single module. For example, the display driving circuit 220 may be mounted on a substrate of the display panel 270, or the display driving circuit 220 and the display panel 270 may be electrically connected through a connection member such as a flexible printed circuit board (FPCB).

The display device 200 may include the display panel 270 and the display driving circuit 220.

The display panel 270 may display an image to the user according to the input image signal IS received from the host processor 100. The display panel 270 may be a display device that receives an electrically transmitted image signal and display a two-dimensional image, such as a thin film transistor-liquid crystal display (TFT-LCD), an organic light emitting diode (OLED) display, a field emission display, a plasma display panel (PDP).

In some implementations, there may be one or more display panels 270. For example, two display panels 270 may provide images for each eye of the user.

The display driving circuit 220 may generate a plurality of analog signals for driving the display panel 270 based on the input image signal IS received from the host processor 100. For example, the plurality of analog signals may include gate signals and data signals that drive the plurality of pixels included in the display panel 270. The display driving circuit 220 may provide gate signals and data signals to a plurality of pixels. The display panel 270 may emit image light corresponding to the input image signal IS by a signal provided by the display driving circuit 220.

The display driving circuit 220 may include a driving controller 250 and a voltage generator 260.

The driving controller 250 may control the voltage generator 260 to generate a plurality of gray scale voltages and a plurality of reference voltages. In some implementations, the driving controller 250 may generate image data corresponding to the image signal IS. In some implementations, the driving controller 250 may measure the DC level of the source signal based on a comparison value between the source signal and the reference voltage provided to the display panel 270 in response to image data. Additionally, the driving controller 250 may measure the slew rate level of the source signal based on a comparison value between the source signal and the reference voltage provided to the display panel 270 in response to the image data.

The driving controller 250 may correct image data based on the DC level of the source signal and the slew rate level of the source signal. In some implementations, the driving controller 250 may transmit the DC level of the source signal and the slew rate level of the source signal to the host processor 100. The host processor 100 may correct the image signal IS based on the DC level of the source signal and the slew rate level of the source signal.

The voltage generator 260 may generate a plurality of gray scale voltages to be provided to the display panel 270 under the control of the driving controller 250. In addition, the voltage generator 260 may generate a reference voltage necessary to measure the DC level of the source signal and the slew rate of the source signal. In some implementations, the reference voltage may be a sawtooth wave voltage or a DC voltage.

Figure 2:
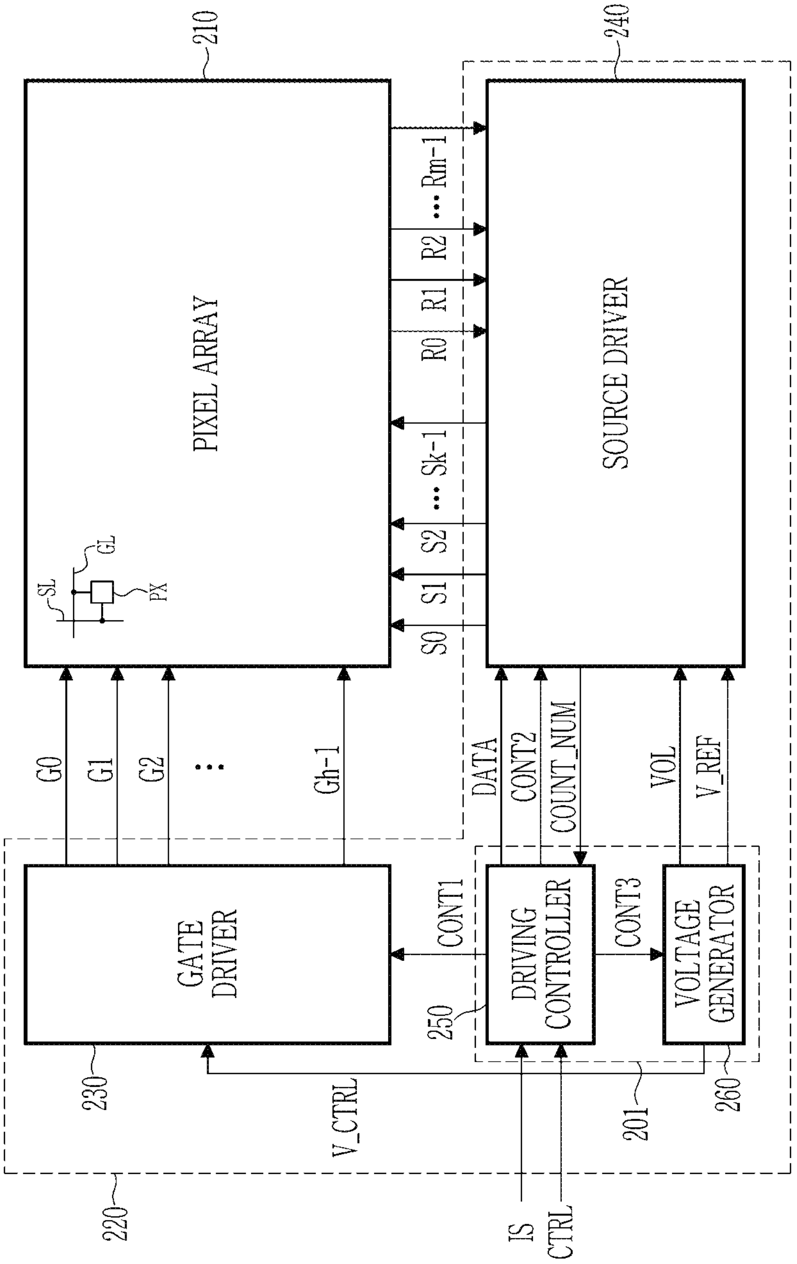
FIG. 2 is a block diagram showing an example of a display device.

FIG. 2 is a block diagram showing an example of a display device.

Referring to FIG. 2, the display device 200 includes a pixel array 210 including a plurality of pixels PX and the display driving circuit 220.

The pixel array 210 includes a plurality of gate lines GL0-GLh−1, a plurality of source lines SL0-SLk−1; SL disposed in a direction intersecting the plurality of gate lines GL0-GLh−1; GL, and a plurality of pixels PX arranged in a region where the plurality of gate lines GL and the plurality of source lines SL intersect.

For example, if the display device 200 is a thin film transistor (TFT) liquid crystal display, each pixel PX may include a TFT with a gate electrode and a source electrode connected to a gate line and a data line, respectively, a liquid crystal capacitor connected to a drain electrode of the TFT, and a storage capacitor. When a specific gate line is selected among the plurality of gate lines GL, the TFTs of the pixels PX connected to the selected gate line are turned on, and then data voltages may be applied to each of the plurality of source lines SL by a source driver 240. The data voltage is applied to the liquid crystal capacitor and the storage capacitor through the TFT of the corresponding pixel PX, and the liquid crystal capacitor and the storage capacitor may be driven to display an image.

In FIG. 2, the pixel PX is shown as connected to one source line SL and one gate line GL, but the connection structure of the signal line of the pixel PX of the display device is not limited thereto. For example, various signal lines may be additionally connected in accordance with the circuit structure of the pixel PX.

The display drive circuit 220 may convert the externally received input image signal IS into a plurality of analog signals, such as a plurality of data voltages, for driving the pixel array 210, and provide the converted plurality of analog signals to the pixel array 210.

The display driving circuit 220 may include a gate driver 230, a source driver 240, a driving controller 250, and a voltage generator 260. A configuration including the driving controller 250 and the voltage generator 260 may be referred to as a main logic 201. The main logic 201 may further include a memory storing arbitrary data for controlling the configuration within the display device 200. However, the present disclosure is not limited thereto, and the memory may be positioned outside of the display device 200.

The gate driver 230 is connected to the plurality of gate lines GL of the pixel array 210 and may sequentially drive the plurality of gate lines GL of the pixel array 210. The gate driver 230 may provide a plurality of gate signals G0, G1, G2, . . . , Gh−1 to the pixel array 210. The plurality of gate signals G0, G1, G2, . . . , Gh−1 may be pulse signals having an enable level and a disable level. The plurality of gate signals G0, G1, G2, . . . , Gh−1 may be applied to the plurality of gate lines GL.

The gate driver 230 may apply the plurality of gate signals G0, G1, G2, . . . , Gh−1 to the plurality of gate lines GL in different ways based on a control signal CONT1 of the driving controller 250. For example, when an enable level gate signal is applied to a pixel PX connected to one of the plurality of gate lines GL, the source signal applied to the source line connected to the corresponding pixel PX among the plurality of source lines SL may be transmitted to the pixel PX.

The source driver 240 is connected to k source lines SL0 to SLk−1 and may output source signals for driving the pixel array 210 through the k source lines. The source driver 240 may implement one frame by outputting source signals for each of h gate lines GL0 to GLh−1.

The source driver 240 may receive data DATA in the form of a digital signal from the driving controller 250. In addition, the source driver 240 may receive a plurality of voltages VOL and reference voltages V_REF from the voltage generator 260. The plurality of voltages VOL may include a plurality of gray scale voltages. The source driver 240 may convert the image data DATA received from the driving controller 250 into source signals S0, S1, S2, . . . , Sk−1 in the form of analog signals based on a plurality of gray scale voltages (or, referred to as gamma voltages) within the plurality of voltages VOL.

The source driver 240 may receive image data DATA in data units corresponding to the plurality of pixels PX included in one horizontal line of the pixel array 210. The image data DATA may include grayscale information corresponding to each pixel PX for displaying the input image signal IS on the pixel array 210. The source driver 240 may output the plurality of source signals S0, S1, S2, . . . , Sk−1 to the pixel array 210 in horizontal line units through the plurality of source lines SL0 to SLk−1. Specifically, the source driver 240 may transmit the plurality of source signals S0, S1, S2, . . . , Sk−1 to the pixel array 210 according to a source driver control signal CONT2 provided from the driving controller 250. The source driver 240 may also be referred to as a data driver.

Since the source driver 240 includes a plurality of amplifiers and decoders as will be described later, even if the plurality of source signals S0, S1, S2, . . . , Sk−1 corresponding to the image data DATA are generated, there may be differences between the plurality of generated source signals S0, S1, S2, . . . , Sk−1 and the source signals that are actually output.

In some implementations, the source driver 240 is connected to m return lines RL0 to RLm−1, and may receive return signals R0, R1, . . . , Rm−1 output from the pixel array 210 in response to the source signal through the m return lines. For example, the return signals R0, R1, . . . , Rm−1 may be signals actually output through the source driver 240 in response to the image data DATA. In FIG. 2, the return line RL is not shown, but each of the plurality of return lines RL0 to RLm−1 may be connected to each of the plurality of source lines SL, and the present disclosure is not limited thereto. For example, the source driver 240 may output the plurality of source signals S0, S1, S2, . . . , Sk−1 in the form of analog signals through an arbitrary source line, and receive the plurality of the return signals R0, R1, . . . , Rm−1 through a source line adjacent to the corresponding source line. Alternatively, the source driver 240 may output a source signal in the form of an analog signal through an arbitrary source line and receive a return signal through the same source line. In some implementations, the source driver 240 may output a source signal through some source lines among a plurality of source lines, and some source lines may not output source signals.

The source driver 240 may obtain a count value COUNT_NUM based on the plurality of source signals S0, S1, S2, . . . , Sk−1 and the return signals R0, R1, . . . , Rm−1 corresponding to each of the plurality of source signals S0, S1, S2, . . . , Sk−1.

Here, the count value COUNT_NUM may represent the difference between the source signal and the return signal. Specifically, the source driver 240 may compare the plurality of reference voltages the return signals R0, R1, . . . , Rm−1 to obtain the count value COUNT_NUM representing a DC level of the return signals R0, R1, . . . , Rm−1 and the count value COUNT_NUM representing a slew rate of the return signals R0, R1, . . . , Rm−1.

Thereafter, the source driver 240 may transmit the obtained count value COUNT_NUM to the driving controller 250.

The driving controller 250 may control the overall operation of the display driving circuit 220. For example, the driving controller 250 may control configurations of the display driving circuit 220 so that the image signal IS may be displayed on the pixel array 210, based on the image signal IS and the drive control signal CTRL from the host device, e.g., host processor 100 of FIG. 1).

For example, the drive control signal CTRL may include a horizontal synchronization signal, a vertical synchronization signal, a main clock signal, and a data enable signal. Specifically, the driving controller 250 may generate image data DATA by dividing the input image signal IS into one frame unit based on the vertical synchronization signal and dividing the input image signal IS into a plurality of gate line GL units based on the horizontal synchronization signal.

In some implementations, the driving controller 250 may generate output image data DATA by converting the format to match the interface specifications with the source driver 240 based on the received input image signal IS, and output the image data DATA to the source driver 240.

The driving controller 250 may control the source driver 240, the gate driver 230, and the voltage generator 260 based on control commands that the driving controller 250 generates independently, separately from the drive control signal CTRL received from a host device, e.g., host processor 100 in FIG. 1, or in addition to the drive control signal CTRL.

In some implementations, the driving controller 250 may control the operation timing of the display driving circuit 220. The driving controller 250 may control the operation timing of the source driver 240, the gate driver 230, and the voltage generator 260 so that the input image signal IS is displayed on the pixel array 210. Specifically, the driving controller 250 may generate various control signals CONT1, CONT2, CONT3 to control the timing of the gate driver 230, source driver 240, and the voltage generator 260. The driving controller 250 may output the first control signal CONT1 to the gate driver 230, output the second control signal CONT2 to the source driver 240, and output the third control signal CONT3 to the voltage generator 260. The first control signal CONT1 may include a control signal that controls the gate level of the plurality of pixels PX. In addition, the second control signal CONT2 may include a switch control signal within the source driver 240, an amplifier control signal, and other components. The third control signal CONT3 may be a signal that causes the voltage generator 260 to generate a reference voltage.

The driving controller 250 may receive the count value COUNT_NUM from the source driver 240. The driving controller 250 may modify the image data DATA based on the received count value COUNT_NUM. For example, when the count value COUNT_NUM is greater than a predetermined value, the driving controller 250 may correct the image data DATA based on the count value COUNT_NUM and provide the corrected image data to the source driver 240 as the image data DATA. For example, the driving controller 250 may correct the image data DATA corresponding to the input image signal IS using a lookup table corresponding to the count value COUNT_NUM. For example, the driving controller 250 may receive a first count value from the source driver 240 and select a lookup table corresponding to the first count value. The driving controller 250 may apply the data value corresponding to the first count value to the image data DATA and output the image data to which the data value is applied as new image data DATA to the source driver 240. For example, applying a count value may mean adding or subtracting a specific value from image data DATA.

However, the present disclosure is not limited thereto, and the source driver 240 may generate a source signal corrected based on the image data DATA received from the driving controller 250 based on the count value COUNT_NUM. Specifically, the source driver 240 may generate a source signal based on the image data DATA received from the driving controller 250, and transmit the corrected source signal to the pixel array 210 through the plurality source lines SL0 to SLk−1 by generating a corrected source signal using a lookup table corresponding to the count value COUNT_NUM.

The voltage generator 260 may generate various voltages necessary to drive the display device 200. The voltage generator 260 may receive a power source voltage from the outside and generate the plurality of voltages VOL based on the power source voltage. Additionally, the voltage generator 260 may generate the plurality of reference voltages V_REF. The reference voltage V_REF may be a voltage used by the driving controller 250 to measure the DC level and slew rate for the source signal.

In some implementations, the configuration of the display driving circuit 220 of the present disclosure may include additional configurations. For example, the configuration of the display driving circuit 220 may be implemented to include a memory that stores input image signals IS frame by frame, or a memory that stores a lookup table in which correction data corresponding to the count value COUNT_NUM is stored to correct the image data DATA.

Memory may be referred to as, for example, graphic random access memory (RAM) or a frame buffer. Memory may include volatile memory such as dynamic random access memory (DRAM), static random access memory (SRAM), or non-volatile memory such as ROM or Flash memory, resistive random access memory (ReRAM), and magnetic random access memory (MRAM). In some implementations, the display driving circuit 220 may further include other general-purpose components, for example, a clock generator, etc.

In FIG. 2, the gate driver 230, the source driver 240, the driving controller 250, and the voltage generator 260 are shown as different functional blocks. In some implementations, each component may be implemented with a different semiconductor chip. In some implementations, at least two components of the gate driver 230, the source driver 240, the driving controller 250, and the voltage generator 260 may be implemented as one semiconductor chip. For example, the gate driver 230, the source driver 240, and the voltage generator 260 may be integrated into one semiconductor chip. Additionally, some components may be integrated on the pixel array 210. For example, the gate driver 230 may be integrated on the pixel array 210.

Figure 3:
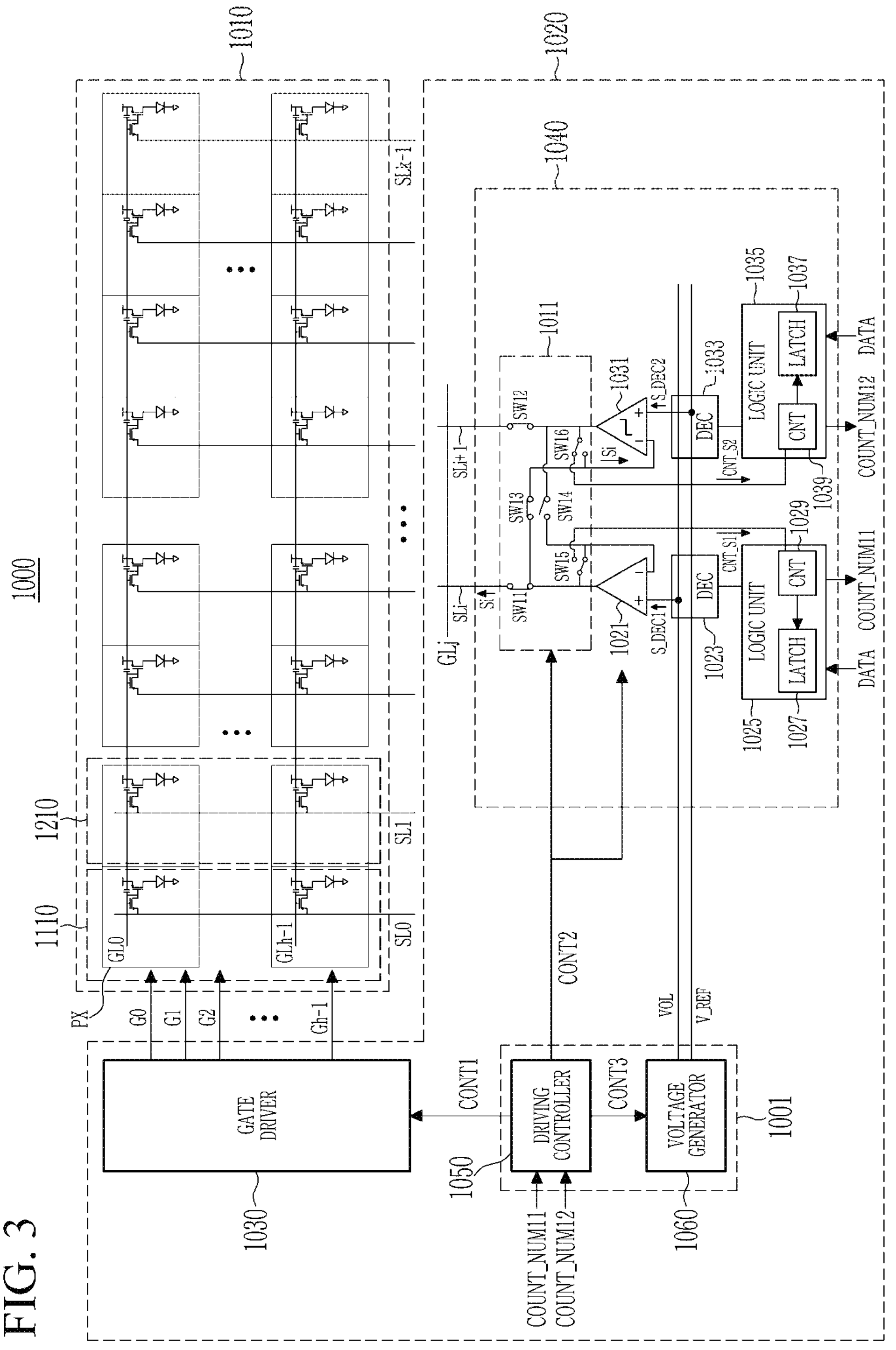
FIG. 3 is a diagram showing an example of a display device.

FIG. 3 is a diagram showing an example of a display device.

As shown in FIG. 3, the display device 1000 includes a pixel array 1010 and a display driving circuit 1020. The display driving circuit 1020 includes a gate driver 1030, a source driver 1040, a driving controller 1050, and a voltage generator 1060. A configuration including the driving controller 1050 and the voltage generator 1060 may be referred to as a main logic 1001. The main logic 1001 may further include a memory storing arbitrary data for controlling the configuration within the display device 1000. However, the present disclosure is not limited thereto, and the memory may be positioned outside of the display device 1000.

The pixel array 1010 may include a plurality of pixels PX. The pixel array 1010 may include a plurality of gate lines GL0, . . . , GLh−1 and a plurality of source lines SL0, . . . , SLk−1 connected to the plurality of pixels PX.

The gate driver 1030 may transmit gate signals G0, . . . , Gh−1 to the plurality of gate lines GL0, . . . , GLh−1 based on the first control signal CONT1 received from the driving controller 1050.

The driving controller 1050 may drive the display device 1000 in a plurality of modes.

For example, when the display device 1000 operates in a driving mode, the driving controller 1050 may generate the first control signal CONT1, the second control signal CONT2, and the third control signal CONT3 corresponding to the driving mode. The display device 1000 may display an image corresponding to the image signal IS while operating in the driving mode. In this case, the second control signal CONT2 may be a signal that controls a plurality of switches SW11 to SW16 within the source driver 1040.

For another example, when the display device 1000 operates in a test mode, the driving controller 1050 may generate the first control signal CONT1, the second control signal CONT2, and the third control signal CONT3 corresponding to the test mode. The display device 1000 may be in a mode for measuring the DC level and slew rate of a source signal Si output by the source driver 1040 while operating in the test mode.

In some implementations, the driving controller 1050 may measure the DC level and the slew rate of the source signal Si output by a channel amplifier 1021 connected to a source line SLi through a second channel amplifier 1031 connected to the adjacent source line SLi+1 of the source line SLi. Specifically, a plurality of source lines SL within the pixel array 1010 may include a first test mode in which a 2n−1th (wherein n is a natural number greater than 1) disposed source line operates in a driving mode and a 2nth disposed source line operates in a comparator mode, and a second test mode in which a 2nth disposed source line operates in a driving mode and a 2n−1th (wherein n is a natural number greater than 1) disposed source line operates in a comparator mode.

Specifically, FIG. 3 is a diagram illustrating an example where the display device 1000 operates in the first test mode. For example, a first source line 1110 may operate in an operation mode, and a second source line 1210 may operate in a test mode.

When the display device 1000 is operating in the first test mode, the driving controller 1050 may generate the first control signal CONT1 corresponding to the first test mode, the second control signal CONT2 corresponding to the first test mode, and the third control signal CONT3 corresponding to the first test mode.

When the display device 1000 operates in the second test mode, the driving controller 1050 may generate the first control signal CONT1 corresponding to the second test mode, the second control signal CONT2 corresponding to the first test mode, and the third control signal CONT3 corresponding to the first test mode.

The voltage generator 1060 may generate various voltages required to drive the display device 1000 under the control of the driving controller 1050. For example, the voltage generator 1060 may include the plurality of voltages VOL and the reference voltage V_REF including a plurality of gray scale voltages.

The source driver 1040 may include logic units 1025 and 1035, decoders 1023 and 1033, channel amplifiers 1021 and 1031, and a selector 1011.

The output terminal of the channel amplifier 1021 may be connected to the selector 1011, the first input terminal of the channel amplifier 1021 may be connected to the selector 1011, and the second input terminal may be connected to the decoder 1023. The selector 1011 may be connected to the output terminal of the channel amplifier 1021, the first input terminal of the channel amplifier 1021, the output terminal of the channel amplifier 1031, the first input terminal of the channel amplifier 1031, the source line SLi, the source line SLi+1, the logic unit 1025, and the logic unit 1035.

The source driver 1040 may convert the image data DATA received from the driving controller 1050 into the source signal Si and output the source signal Si through the first source line (SLi, i is an integer greater than 0 and less than or equal to k−2). In addition, the source driver 1040 may convert the image data DATA received from the driving controller 1050 into the source signal Si+1 and output the source signal Si+1 through the second source line (SLi+1, i is an integer greater than 0 and less than or equal to k−2).

In some implementations, the source driver 1040 may measure the DC level difference between the source signal Si output through the channel amplifier 1021 and a decoder signal S_DEC1 output to the channel amplifier 1021 through the decoder 1023. Additionally, the source driver 1040 may measure the slew rate of the source signal Si. The source driver 1040 may generate the count value COUNT_NUM based on the measured DC level and slew rate.

The logic units 1025 and 1035 may receive image data DATA from the driving controller 1050 and transmit the count value COUNT_NUM to the driving controller 1050. The present disclosure is not limited thereto, and the logic units 1025 and 1035 may transmit the count value COUNT_NUM to the host processor (100 in FIG. 1) or separate test equipment.

The first logic unit 1025 may include a latch 1027 and a counter 1029. The second logic unit 1035 may include a latch 1037 and a counter 1039.

The latches 1027 and 1037 may receive image data DATA from the driving controller 1050. The latches 1027 and 1037 may sample and store image data DATA under the control of the driving controller 1050. The latches 1027 and 1037 may transmit sampled image data to the decoders 1023 and 1033. In some implementations, the latches 1027 and 1037 may include a sampling circuit that samples data and a holding latch that stores data sampled by the sampling circuit.

The counters 1029 and 1039 generate a first count value COUNT_NUM1 based on a counter input signal CNT_S1 received from the selector 1011. The counter 1039 generates a second count value COUNT_NUM2 based on a counter input signal CNT_S2 received from the selector 1011. Here, the counter input signal CNT_S1 may be a signal indicating the source signal Si or a signal indicating the comparison result of comparing the source signal Si+1 and the reference voltage V_REF, and the counter input signal CNT_S2 may be a signal indicating the source signal Si+1 or a signal indicating a comparison result of comparing the source signal Si and the reference voltage V_REF.

Each of the counters 1029 and 1039 may transmit the generated first count value COUNT_NUM1 and the second count value COUNT_NUM2 to the driving controller 1050. Alternatively, the counter 1029 may transmit the generated first count value COUNT_NUM1 to the latch 1027 or the generated second count value COUNT_NUM2 to the latch 1039.

In FIG. 3, the latch 1027 and the counter 1029 are shown as being included in the logic unit 1025, and the latch 1037 and the counter 1039 are shown as being included in the logic unit 1035. However, the present disclosure is not limited thereto, and the latch and counter may be configured separately from the source driver 1040.

The decoders 1023 and 1033 may receive sampled image data from the corresponding latches 1027 and 1037. The decoder 1023 may receive a plurality of voltages VOL from the voltage generator 1060. The plurality of voltages VOL may include gamma voltages corresponding to various levels of luminances of the display device 1000. The number of gamma voltages may be determined based on the number of colors to be displayed through the pixel array 1010 or the number of bits of digital data provided from outside the display device 1000. In some implementations, the decoder 1023 may select one of the plurality of voltages VOL in response to sampled image data. The decoder 1023 may output the selected gamma voltage(s) to the channel amplifier 1021. The decoder 1033 may receive the reference voltage V_REF from the voltage generator 1060. For example, the reference voltage V_REF may be a DC voltage or a sawtooth waveform. In some implementations, the decoders 1023 and 1033 may be implemented as digital-to-analog converters.

The channel amplifier 1021 may receive the gamma voltage selected from the decoder 1023, amplify the gamma voltage selected by the decoder 1023 in response to the second control signal CONT2 received from the driving controller 1050, and transmit the selected gamma voltage to the selector 1011 as the source signal Si. The channel amplifier 1021 may be implemented as an operational amplifier. For example, the channel amplifier 1021 may output the source signal Si through the first source line SLi. As the channel amplifier 1021 is connected to the corresponding source line SLi, the channel amplifier 1021 and the decoder 1023 may control the driving of the source line SLi.

In some implementations, the channel amplifier 1021 may include a first input terminal, a second input terminal through which a gamma voltage is input from the decoder 1023, and an output terminal through which an output voltage is output. The channel amplifier 1031 may include a first input terminal, a second input terminal through which a reference voltage is input from the voltage generator 1060, and an output terminal. The first input terminal of each of the channel amplifiers 1021 and 1031 may be connected to the output terminal of each of the channel amplifiers 1021 and 1031. In some implementations, the first input terminal of the channel amplifier may be an inverting input terminal of the channel amplifier, and the second input terminal may be a non-inverting input terminal of the channel amplifier.

For example, the output voltage of the channel amplifiers 1021 and 1031 may be input as an input voltage to the inverting input terminal of the channel amplifiers 1021 and 1031. The channel amplifiers 1021 and 1031 may be implemented as unit buffers.

The selector 1011 may be connected to the first channel amplifier 1021 and the second channel amplifier 1031, and to two adjacent source lines SLi, SLi+1. The selector 1011 may include first to sixth switches SW11, SW12, SW13, SW14, SW15, and SW16. The selector 1011 may control the connection relationship between the plurality of switches SW11 to SW16 within the selector 1011 based on the second control signal CONT2 received from the driving controller 1050. Specifically, the first switch SW11 may be connected between the first source line SLi and the output terminal of the first channel amplifier 1021, and the second switch SW12 may be connected between the second source line SLi+1 and the output terminal of the second channel amplifier 1031. The third switch SW13 may be connected to one end of the first switch SW11 (e.g., the output terminal of the first channel amplifier 1021) and the first input terminal of the second channel amplifier 1031. The fourth switch SW14 may be connected to one end of the second switch SW12 (e.g., the output terminal of the second channel amplifier 1031) and the first input terminal of the first channel amplifier 1021. The fifth switch SW15 may connect one end of the first switch SW11 (e.g., the output terminal of the first channel amplifier 1021) and the logic unit 1025 according to the second control signal CONT2 or connect one end of the first switch SW11 and the first input terminal of the first channel amplifier 1021. The sixth switch SW16 may connect one end of the first switch SW12 (e.g., the output terminal of the second channel amplifier 1031) and the logic unit 1035 according to the second control signal CONT2 or connect one end of the second switch SW12 and the first input terminal of the second channel amplifier 1031. In FIG. 3, the fifth switch SW15 and the sixth switch SW16 are each shown as a single-pole double-throw (SPDT) switch, but the present disclosure is not limited thereto. Each of the fifth switch SW15 and the sixth switch SW16 may be implemented as two switches.

In some implementations, when the display device 1000 operates in a driving mode, the driving controller 1050 may generate the second control signal CONT2 corresponding to the driving mode and transmit the second control signal CONT2 to the selector 1011, as described above. For example, the second control signal CONT2 may be a signal that controls the plurality of switches SW11 through SW16 such that the channel amplifier 1021 is connected to the corresponding source line SLi and the channel amplifier 1031 is connected to the corresponding source line SLi+1.

Based on the second control signal CONT2, the first switch SW11 and the second switch SW12 may be turned on, the third switch SW13 and the fourth switch SW14 may be turned off, the fifth switch SW15 may be connected to the first input terminal of the first channel amplifier 1021, and the sixth switch SW16 may be connected to the first input terminal of the second channel amplifier 1031. Accordingly, the selector 1011 may receive the first source signal Si from the first channel amplifier 1021 and transmit the first source signal Si to the source line SLi and may receive the second source signal Si+1 from the second channel amplifier 1031 and transmit the second source signal Si+1 to the source line SLi+1. The third control signal CONT3 may be a signal that controls the voltage generator 1060 to generate a voltage provided to the display driving circuit 1020. For example, the third control signal CONT3 may be a signal that controls the transmission of a plurality of gray scale voltages to the decoders 1023 and 1033 as the plurality of voltages VOL. Alternatively, the third control signal CONT3 may be a signal that controls the voltage generator 1060 to generate a plurality of reference voltages and transmit the plurality of reference voltages to the channel amplifier 1021 or the channel amplifier 1031 through the decoders 1023 and 1033.

In some implementations, when the display device 1000 operates in a test mode, the driving controller 1050 may generate the second control signal CONT2 corresponding to the test mode and transmit the second control signal CONT2 to the selector 1011, as described above. The second control signal CONT2 may be a signal that controls the plurality of switches SW11 to SW16 so that the output of the channel amplifier 1021 or the channel amplifier 1031 is connected to the first input terminal of the adjacent channel amplifier.

For example, in the case of the first test mode, based on the second control signal CONT2 corresponding to the first test mode, the first switch SW11, the second switch SW12, and the third switch SW13 may be turned on, the fourth switch SW14 may be turned off, the fifth switch SW15 may connect one end of the first switch SW11 and the first input terminal of the first channel amplifier 1021, and the sixth switch SW16 may connect the output of the second channel amplifier 1031 and the logic unit 1035. Accordingly, the selector 1011 may receive the first source signal Si from the first channel amplifier 1021 and transmit the first source signal Si to the source line SLi and transmit the first source signal Si to the first input terminal of the second channel amplifier 1031 through the third switch SW13. The second channel amplifier 1031 may compare the first source signal Si input to the first input terminal and the reference voltage received from the second decoder 1033, and transmit the comparison result to the logic unit 1035 through the sixth switch SW16. The third control signal CONT3 may be a signal that controls the voltage generator 1060 to transmit a plurality of gray scale voltages to the decoder 1023 as the plurality of voltages VOL and the reference voltage V_REF to the decoder 1033. In this case, the reference voltage V_REF may be input to the second channel amplifier 1031 through the decoder 1033.

For another example, in the case of the second test mode, based on the second control signal CONT2 corresponding to the second test mode, the first switch SW11, the second switch SW12, and the fourth switch SW14 may be turned on, the third switch SW13 may be turned off, the fifth switch SW15 may connect one end of the first switch SW11 and the logic unit 1025, and the sixth switch SW16 may connect one end of the second switch SW12 and the first input terminal of the second channel amplifier 1031. Accordingly, the selector 1011 may receive the second source signal Si+1 from the second channel amplifier 1031 and transmit the second source signal Si+1 to the source line SLi+1 and transmit the second source signal Si+1 to the first input terminal of the second channel amplifier 1031 through the fourth switch SW14. The first channel amplifier 1021 may compare the second source signal Si+1 input to the first input terminal and the reference voltage received from the first decoder 1023, and transmit the comparison result to the logic unit 1025 through the fifth switch SW15. The third control signal CONT3 may be a signal that controls the voltage generator 1060 to transmit a plurality of gray scale voltages to the decoder 1023 as the plurality of voltages VOL and the reference voltage V_REF to the decoder 1033. In this case, the reference voltage V_REF may be input to the first channel amplifier 1021 through the decoder 1023.

In general, the 1-line pixel charging time of panel is continuously decreasing to drive high-frequency and high-resolution displays.

Additionally, a greater number of source lines may be required within the display driving circuit to support high resolution. An increase in the number of source lines may increase the load when transmitting the gamma voltage, thereby slowing down the settling time of the gamma voltage. The slowing down of the settling time may worsen the stabilization time of the source line and cause issues in driving the display device at high speed.

Figure 4:
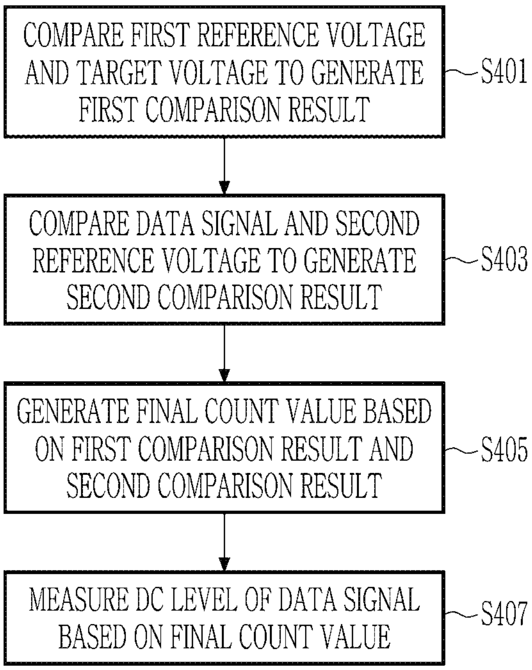
FIG. 4 is a flowchart showing an example of a method when the display device of FIG. 3 operates in a DC level measurement mode.
Figure 5:
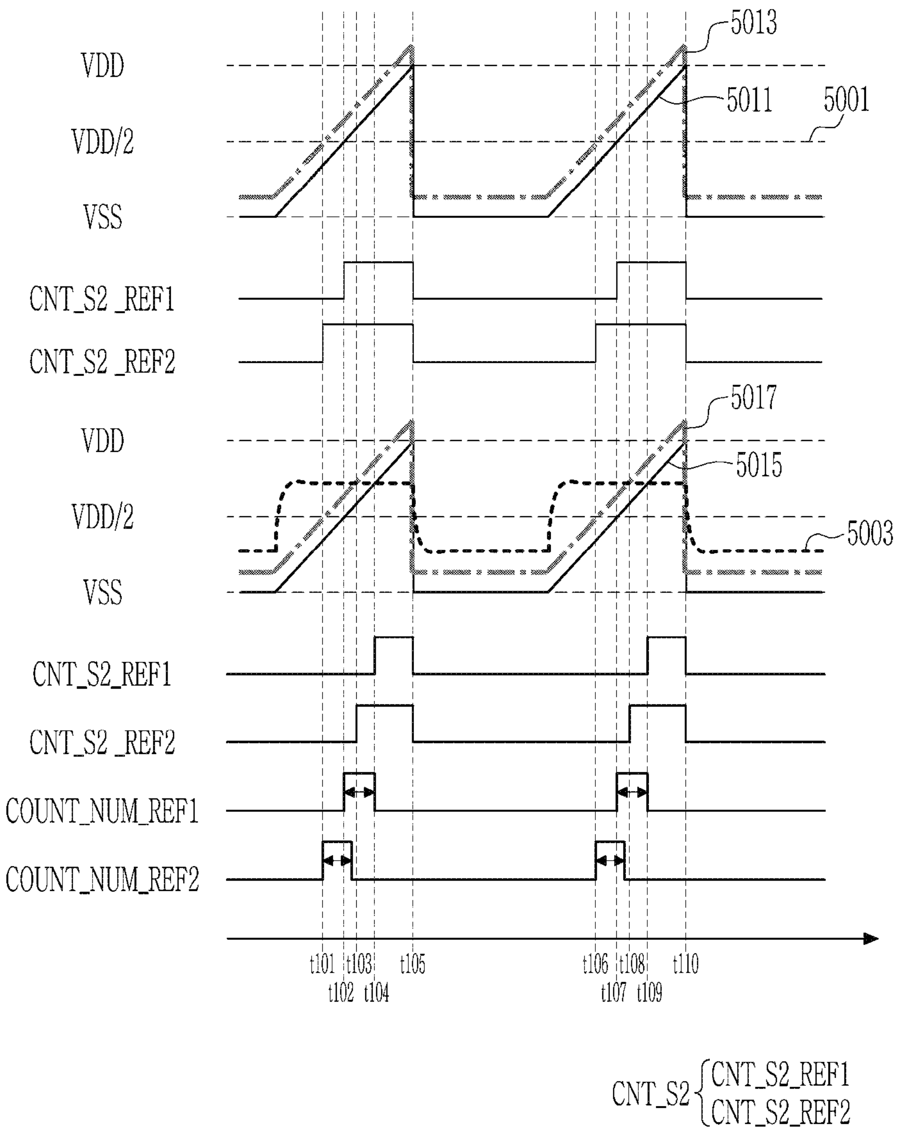
FIG. 5 is a timing diagram showing an example of the operation of the display device of FIG. 3 when the display device operates in a DC level measurement mode.
Figure 6:
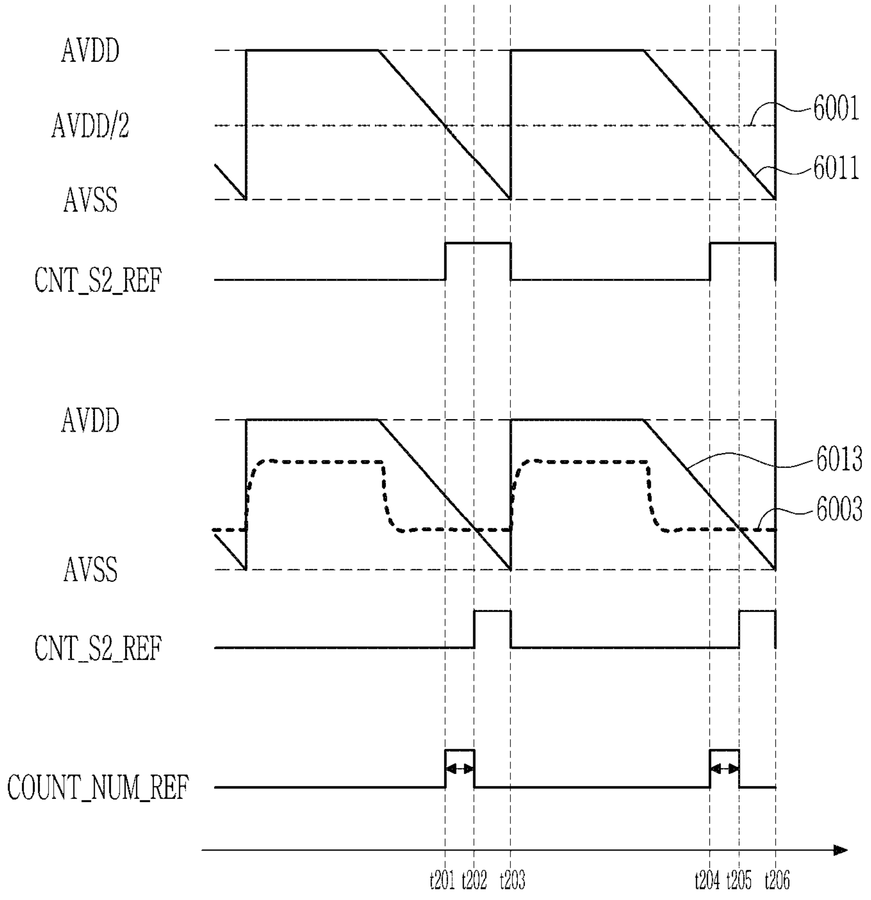
FIG. 6 is a timing diagram showing an example of the operation of the display device of FIG. 3 when the display device operates in a DC level measurement mode.

FIG. 4 is a flowchart showing an example of a method when the display device of FIG. 3 operates in a DC level measurement mode. FIG. 5 is a timing diagram showing an example of the operation of the display device of FIG. 3 when the display device operates in a DC level measurement mode. Specifically, FIGS. 5 and 6 illustrate the reference voltage V_REF output from the voltage generator 1060 and the outputs of the source signal Si and the logic units 1025 and 1035 when the display device 1000 is operating in DC level measurement mode.

The display device 1000 compares the first reference voltage and the target voltage to generate a first comparison result (S401). In some implementations, the display device 1000 may generate a plurality of first reference voltages and compare each of the plurality of first reference voltages with the target voltage to generate a plurality of first comparison results. In FIG. 5, the case where the display device 1000 generates two first comparison results is described as an example, but the present disclosure is not limited thereto, and the display device 1000 may generate an appropriate number of first comparison results.

Hereinafter, the signal to be the target of the comparison is referred to as a target voltage, and the signal to be the reference of the comparison is referred to as a reference voltage.

The voltage generator 1060 may generate a first sawtooth waveform 5011 having an arbitrary DC level. The first sawtooth waveform 5011 may be input to the second input terminal of the first channel amplifier 1021 through the first decoder 1023. Thereafter, the output from the first channel amplifier 1021 may be input to the first input terminal of the second channel amplifier 1031. In some implementations, the first input terminal of the channel amplifier may be an inverting input terminal of the channel amplifier, and the second input terminal may be a non-inverting input terminal of the channel amplifier.

The voltage generator 1060 may generate the first reference voltage 5001 with a DC level of a first value as the reference voltage V_REF, and the first reference voltage 5001 may be output as a second decoder signal S_DEC2 through the second decoder 1033.

In FIG. 5, the first value is shown as VDD/2, but the present disclosure is not limited thereto, and the reference voltage V_REF may be a DC voltage having an arbitrary level.

The second channel amplifier 1031 may compare the first reference voltage 5001 and the first sawtooth waveform 5011, and output the comparison result to the logic unit 1035 as a counter signal CNT_S2. When the first sawtooth waveform 5011 has a first DC level, the first sawtooth waveform 5011 has a higher value than the first reference voltage 5001 during t102 to t105, so a counter signal CNT_S2_REF1 may have a high level.

The counter 1039 may generate a count value COUNT_NUM12 by counting the time for which the counter signal CNT_S2_REF1 maintains a certain level. Thereafter, the logic unit 1035 may transmit the generated count value COUNT_NUM12 to the driving controller 1050 as a reference count value. The driving controller 1050 may obtain a count value according to the DC level of the first sawtooth waveform 5011 with respect to the first reference voltage 5001.

In some implementations, the voltage generator 1060 may generate the first reference voltage 5001 with the first value as the reference voltage V_REF, and the first reference voltage 5001 may be output as the second decoder signal S_DEC2 through the second decoder 1033. The second channel amplifier 1031 may compare the first reference voltage 5001 and the first sawtooth waveform 5011, and output the comparison result to the logic unit 1035 as a counter signal CNT_S2.

The counter 1039 in the logic unit 1035 may generate the count value COUNT_NUM12 by counting the time for which the counter signal CNT_S2, that is, the count signal CNT_S2_REF1, maintains a certain level. Thereafter, the logic unit 1035 may transmit the generated count value COUNT_NUM12 to the driving controller 1050 as a reference count value.

Accordingly, the driving controller 1050 may obtain a count value representing the DC level of the first sawtooth waveform 5011 with respect to one reference voltage V_REF. The driving controller 1050 may compare the target voltage, which is a plurality of sawtooth waveforms, and the first reference voltage, which is a DC voltage, to measure a change in the count value as the DC level of the target voltage changes, and the result of this comparison may be referred to as a first comparison result.

In some implementations, the driving controller 1050 may store a plurality of first comparison results in the form of a lookup table.

The display device 1000 compares the source signal and the second reference voltage to generate a second comparison result (S403).

The voltage generator 1060 may generate a plurality of gray scale voltages as a plurality of voltages VOL and input the plurality of gray scale voltages to the first decoder 1023. The first decoder 1023 may select a gray scale voltage corresponding to the image data DATA from among the plurality of voltages VOL and output the gray scale voltage to the first channel amplifier 1021 as the decoder signal S_DEC1. The first channel amplifier 1021 may output the source signal Si as a target voltage. The source signal Si output through the first channel amplifier 1021 may be input to the first input terminal of the second channel amplifier 1031 through the third switch SW13.

The voltage generator 1060 may generate a first sawtooth waveform 5015 having an arbitrary DC level as a reference voltage. In this case, the first sawtooth waveform 5015 may be the target voltage in step S401 of generating the first comparison result. The first sawtooth waveform 5015 may be input to the second input terminal of the second channel amplifier 1031 through the second decoder 1033. Thereafter, the output from the first channel amplifier 1021 may be input to the first input terminal of the second channel amplifier 1031. The second channel amplifier 1031 may compare the source signal Si and the first sawtooth waveform 5015, and output the comparison result as the counter signal CNT_S2 to the logic unit 1035. The counter signal CNT_S2, that is, the counter signal CNT_S2_REF1, may have a high level during t104 to t105.

The counter 1039 may generate the count value COUNT_NUM12 by counting the time for which the counter signal CNT_S2_REF1 maintains a certain level. The driving controller 1050 may obtain a count value according to the DC level of the source signal 5003 with respect to the second reference voltage, which is the first sawtooth waveform 5015.

The driving controller 1050 may generate a value obtained by subtracting the count value of the second comparison result from the count value of the first comparison result as the final count value. For example, in FIG. 5, the count value of the DC level of the first sawtooth waveform 5011 for the first reference voltage 5001 is the first value (corresponding to t102 to t105), and the count value of the DC level of the source signal 5003 for the first reference voltage, which is the first sawtooth waveform 5015, may be the second value (corresponding to t104 to t105). The driving controller 1050 may determine a value obtained by subtracting the second value from the first value, that is, a value calculated by counting the time (t102 to t104) during which the final count signal COUNT_NUM_REF1 maintains a certain level, as the final count value.

In some implementations, the voltage generator 1060 may generate a second sawtooth waveform 5013 having a different DC level from the first sawtooth waveform 5011. The second sawtooth waveform 5013 may be input to the second input terminal of the first channel amplifier 1021 through the first decoder 1023. Thereafter, the output from the first channel amplifier 1021 may be input to the input terminal of the second channel amplifier 1031.

In some implementations, the voltage generator 1060 may generate the first reference voltage 5001 with the first value as the reference voltage V_REF, and the first reference voltage 5001 may be output as the second decoder signal S_DEC2 through the second decoder 1033. The second channel amplifier 1031 may compare the first reference voltage 5001 and the second sawtooth waveform 5013, and output the comparison result to the logic unit 1035 as the counter signal CNT_S2. When the second sawtooth waveform 5013 has a second DC level, the second sawtooth waveform 5013 has a higher value than the first reference voltage 5001 during t101 to t105, so the count signal CNT_S2_REF2 may have a high level.

The driving controller 1050 may obtain a count value according to the DC level of the second sawtooth waveform 5013 with respect to the first reference voltage 5001.

Similarly, the display device 1000 may generate a second sawtooth waveform 5017 having an arbitrary DC level as a reference voltage. In this case, the second sawtooth waveform 5017 may be the target voltage in step S401 of generating the first comparison result. The second sawtooth waveform 5017 may be input to the second input terminal of the second channel amplifier 1031 through the second decoder 1033. Thereafter, the output from the first channel amplifier 1021 may be input to the first input terminal of the second channel amplifier 1031. The second channel amplifier 1031 may compare the source signal Si and the second sawtooth waveform 5017 and output the comparison result as the counter signal CNT_S2 to the logic unit 1035. The counter signal CNT_S2, that is, the counter signal CNT_S2_REF2, may have a high level during t103 to t105.

The counter 1039 may generate the count value COUNT_NUM12 by counting the time for which the count signal CNT_S2_REF2 maintains a certain level. The driving controller 1050 may obtain a count value based on the DC level of the source signal 5003, that is, the second sawtooth waveform 5017, with respect to the reference voltage.

The display device 1000 generates a final count value based on the first comparison result and the second comparison result (S403).

The count value of the DC level of the second sawtooth waveform 5013 with respect to the first reference voltage 5001 may be a third value (corresponding to t101 to t105), and the count value of the DC level of the source signal 5003 with respect to the second sawtooth waveform 5017 may be a fourth value (t103 to t105). The driving controller 1050 may determine a value obtained by subtracting the fourth value from the third value, that is, a value calculated by counting the time (t101 to t103) during which the final count signal COUNT_NUM_REF2 maintains a certain level, as the final count value.

The driving controller 1050 may obtain the counter value CNT_S2_REF1 indicating a value of the first sawtooth waveform 5011 relative to the first reference voltage 5001, and the counter value CNT_S2_REF1 indicating a value of the source signal 5003 relative to the first sawtooth waveform 5011.

Additionally, the driving controller 1050 may obtain the counter value CNT_S2_REF2 indicating a value of the first sawtooth waveform 5011 relative to the second reference voltage, e.g., first sawtooth waveform 5015, and the counter value CNT_S2_REF2 indicating a value of the source signal 5003 relative to the second sawtooth waveform 5013. The driving controller 1050 may obtain a count value indicating the source signal regardless of the type of reference voltage. That is, the driving controller 1050 may obtain a count value indicating the source signal regardless of the offset level of the reference voltage, and thus can accurately measure the source voltage.

The display device 1000 measures the DC level of the source signal based on the final count value (S407).

In some implementations, the driving controller 1050 may have a DC level difference corresponding to the count value set in advance based on a plurality of first comparison results. The driving controller 1050 may measure the DC level of the source signal 5003 based on the final count value. In some implementations, the higher the DC level of the source signal 5003, the smaller the final count value may be.

The driving controller 1050 may change the image data DATA based on the DC level of the measured source signal. For example, when the source signal 5003 has a high DC level, the driving controller 1050 may generate modified image data by adding an arbitrary value to the image data DATA and transmit the modified image data to the source driver 1040.

As described above, FIG. 5 shows the reference voltages, e.g., first reference voltage 5001, first sawtooth waveform 5015, and second sawtooth waveform 5017, the source signal 5003 and count value CNT_S2 when the display device 1000 is operating in the first test mode, e.g., when the source line SLi is operating in the driving mode and the source line SLi+1 is operating in the test mode.

However, the present disclosure is not limited thereto, and it may be possible for the display device 1000 to operate in the second test mode.

In summary, in FIG. 5, the voltage generator 1060 generated a sawtooth waveform and a DC voltage, set the sawtooth waveform as a target voltage and the DC voltage as a reference voltage, and compared the target voltage to the reference voltage to generate a first comparison result. Then, a case where the voltage generator 1060 generates a source signal and a sawtooth waveform, sets the source signal as a target voltage and sets the sawtooth waveform as a reference voltage to compare the target voltage to the reference voltage to generate a second comparison result, and measures the DC level of a source signal based on the first comparison result and the second comparison result is shown. However, the present disclosure is not limited thereto, and the voltage generator 1060 may measure the DC level of the source signal by using a waveform other than a sawtooth waveform as a target voltage or reference voltage.

The operation of the display device 1000 from t101 to t105 may be similar to the operation of the display device 1000 from t106 to t110.

FIG. 6 is a timing diagram showing an example of the operation of the display device of FIG. 3 when the display device operates in a DC level measurement mode.

In some implementations, voltage generator 1060 may measure the DC level of the source signal using a voltage that has the form of a ramp waveform. Depending on the type of voltage used by the display device 1000 to measure the DC level of the source signal, the absolute count value according to the comparison result may vary. However, since the display device 1000 measures the DC level of the source signal based on the difference between the reference first comparison result and the measured second comparison result, the DC level may not be affected by the type of voltage used.

Specifically, FIG. 6 shows a timing diagram when the voltage generator 1060 measures the DC level of the source signal using a voltage having a ramp waveform. The description of the operation of the display device 1000 described above with reference to FIGS. 4 and 5 when operating in the DC level measurement mode may also be applied to FIG. 6 unless otherwise specified.

The voltage generator 1060 may generate a ramp waveform 6011 having an arbitrary DC level. The ramp waveform 6011 may be input to the second input terminal of the first channel amplifier 1021 through the first decoder 1023. Thereafter, the output from the first channel amplifier 1021 may be input to the first input terminal of the second channel amplifier 1031. In some implementations, the first input terminal of the channel amplifier may be an inverting input terminal of the channel amplifier, and the second input terminal may be a non-inverting input terminal of the channel amplifier.

The voltage generator 1060 may generate the DC voltage 6001 with the first value as the reference voltage V_REF, and the DC voltage 6001 may be output as the second decoder signal S_DEC2 through the second decoder 1031. In FIG. 6, the first value is shown as VDD/2, but the present disclosure is not limited thereto, and the reference voltage V_REF may be a DC voltage having an arbitrary level.

The second channel amplifier 1031 may compare the DC voltage 6001 and the ramp waveform 6011 and output the comparison result as the counter signal CNT_S2 to the logic unit 1035. When the ramp waveform 6011 has a first DC level, the ramp waveform 6011 has a higher value than the first reference voltage, e.g., DC waveform 6001, during t201 to t203, so the counter signal CNT_S2_REF1 may have a high level.

The counter 1039 may generate the count value COUNT_NUM12 by counting the time for which the counter signal CNT_S2_REF maintains a certain level. Thereafter, the logic unit 1035 may transmit the generated count value COUNT_NUM12 to the driving controller 1050 as a reference count value. The driving controller 1050 may obtain a count value according to the DC level of the ramp waveform 6011 with respect to the first reference voltage, e.g., DC waveform 6001.

The voltage generator 1060 may generate a plurality of gray scale voltages as the plurality of voltages VOL and input the plurality of gray scale voltages to the first decoder 1023. The first decoder 1023 may select a gray scale voltage corresponding to the image data DATA from among the plurality of voltages VOL and output the gray scale voltage to the first channel amplifier 1021 as the decoder signal S_DEC1. The first channel amplifier 1021 may output the source signal Si as a target voltage. The source signal Si output through the first channel amplifier 1021 may be input to the first input terminal of the second channel amplifier 1031 through the third switch SW13.

The display device 1000 may generate a second sawtooth waveform 5017 having an arbitrary DC level as a reference voltage. At this time, the second ramp waveform 6013 may have the same voltage as the ramp waveform 6011. The second channel amplifier 1031 may compare the source signal Si and the first sawtooth waveform 5015 and output the comparison result as the counter signal CNT_S2 to the logic unit 1035. The counter signal CNT_S2_REF may have a certain level during t202 to t203.

The counter 1039 may generate the count value COUNT_NUM12 by counting the time for which the count signal CNT_S2_REF maintains a certain level. The driving controller 1050 may obtain a count value according to the DC level of the second ramp waveform 6013, that is, the source signal Si with respect to the reference voltage.

Next, the driving controller 1050 may generate a value obtained by subtracting the count value of the second comparison result from the count value of the first comparison result as the final count value. For example, in FIG. 6, the count value of the DC level of the first target value, e.g., ramp waveform 6011, for the reference voltage, e.g., DC voltage 6001, may be the first value (corresponding to t201 to t203), and the count value of the DC level of the second target voltage 6003 for the reference voltage, e.g., second ramp waveform 6013, may be the second value (corresponding to t202 to t203). The driving controller 1050 may determine a value obtained by subtracting the second value from the first value, that is, a value calculated by counting the time (t201 to t202) during which the final count signal COUNT_NUM_REF maintains a certain level, as the final count value. In FIG. 6, the count value of the DC level of the first target value, e.g., ramp waveform 6011, for the reference voltage, e.g., DC voltage 6001, may be the first value (corresponding to t201 to t203), and the count value of the DC level of the second target voltage 6003 for the reference voltage, e.g., second ramp waveform 6013, may be the second value (corresponding to t201 to t202). The driving controller 1050 may determine a value obtained by subtracting the first value from the second value, that is, a value calculated by counting the time (t201 to t202) during which the final count signal COUNT_NUM_REF maintains a certain level, as the final count value.

The driving controller 1050 may measure the DC level of the source signal 5003 based on the final count value. In some implementations, the higher the DC level of the source signal 5003, the smaller the final count value may be.

The driving controller 1050 may change the image data DATA based on the DC level of the measured source signal.

The driving controller 1050 may set an appropriate reference voltage according to the shape of the waveform of the source signal. For example, if there is a lot of data indicating white in the image data DATA, there is a high probability that the waveform of the source signal will have a low value. In this case, the driving controller 1050 may measure the DC level of the waveform of the source signal using the ramp signal as a reference voltage.

Figure 7:
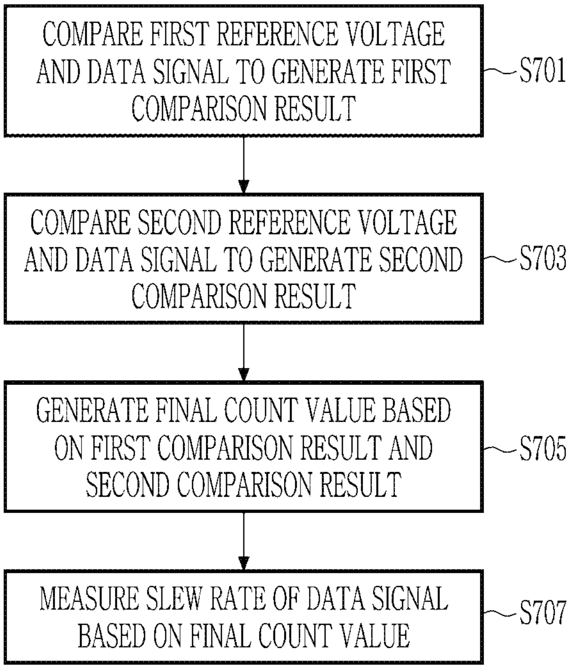
FIG. 7 is a flowchart showing an example of a method when the display device of FIG. 3 operates in a slew rate measurement mode.
Figure 8:
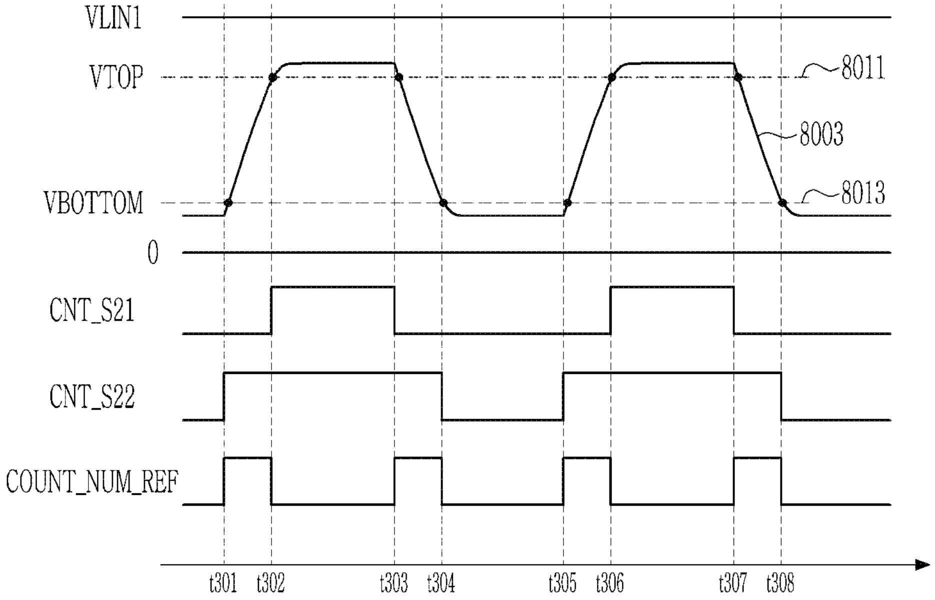
FIG. 8 is a timing diagram showing an example of the operation of the display device of FIG. 3 when the display device operates in a slew rate measurement mode.

FIG. 7 is a flowchart showing an example of a method when the display device of FIG. 3 operates in a slew rate measurement mode. FIG. 8 is a timing diagram showing an example of the operation of the display device of FIG. 3 when the display device operates in a slew rate measurement mode. Specifically, FIGS. 7 and 8 illustrate the reference voltage V_REF output from the voltage generator 1060 and the outputs of the source signal Si and the logic units 1025 and 1035 when the display device 1000 is operating in DC level measurement mode.

The display device 1000 compares the first reference voltage and the source signal to generate a first comparison result (S701).

The voltage generator 1060 may generate a plurality of gray scale voltages as the plurality of voltages VOL and input the plurality of gray scale voltages to the first decoder 1023. The first decoder 1023 may select a gray scale voltage corresponding to the image data DATA from among the plurality of voltages VOL and output the gray scale voltage to the first channel amplifier 1021 as the decoder signal S_DEC1. The first channel amplifier 1021 may output the source signal Si as a target voltage. The source signal Si output through the first channel amplifier 1021 may be input to the first input terminal of the second channel amplifier 1031 through the third switch SW13. In some implementations, the first input terminal of the channel amplifier may be an inverting input terminal of the channel amplifier, and the second input terminal may be a non-inverting input terminal of the channel amplifier.

The voltage generator 1060 may generate a DC voltage 8001 with the first value as the reference voltage V_REF, and the DC voltage 8001 may be output as the second decoder signal S_DEC2 through the second decoder 1033. In FIG. 8, the first value is shown as having a VTOP value, and the VTOP value may be, for example, a value that is 90% of a power source voltage VDD.

The second channel amplifier 1031 may compare the DC voltage 8011 and a source signal 8003 and output the comparison result as the counter signal CNT_S2 to the logic unit 1035. Since the source signal 8003 has a value greater than the DC voltage 8011 during t302 to t303, a counter signal CNT_S21 may have a high level during t302 to t303.

The counter 1039 may generate the count value COUNT_NUM12 by counting the time for which the count signal CNT_S21 maintains a certain level. Thereafter, the logic unit 1035 may transmit the generated count value COUNT_NUM12 to the driving controller 1050 as a reference count value.

The display device 1000 compares the second reference voltage and the source signal to generate a second comparison result (S703).

The voltage generator 1060 may generate a DC voltage 8013 with the second value as the reference voltage V_REF, and the DC voltage 8013 may be output as the second decoder signal S_DEC2 through the second decoder 1033. In FIG. 8, the first value is shown as having a VBOTTOM value, and the VBOTTOM value may be, for example, a value of 10% of the power source voltage VDD.

The second channel amplifier 1031 may compare the DC voltage 8013 and a source signal 8003 and output the comparison result as the counter signal CNT_S2 to the logic unit 1035. Since the source signal 8003 has a value greater than the DC voltage 8013 during t301 to t304, a counter signal CNT_S22 may have a high level during t301 to t304.

The counter 1039 may generate the count value COUNT_NUM12 by counting the time for which the count signal CNT_S22 maintains a certain level. Thereafter, the logic unit 1035 may transmit the generated count value COUNT_NUM12 to the driving controller 1050 as a reference count value.

In some implementations, the display device 1000 may count the count signal CNT_S21 and CNT_S22 based on an internal clock.

The display device 1000 generates a final count value based on the first comparison result and the second comparison result (S705).

The driving controller 1050 may determine the final count value by performing an OR operation based on the count signal CNT_S21 and CNT_S22. As shown in FIG. 8, the final count value is shown as the result signal COUNT_NUM_REF, which may be a signal obtained by subtracting the count signal CNT_S21 from the count signal CNT_S22. That is, the final result value may indicate a case where the source signal 8003 has a value between the VTOP voltage value and the VBOTTOM voltage value.

Accordingly, the driving controller 1050 may obtain a count value according to the slew rate of the source signal 8003 for the DC voltage 8011 and the DC voltage 8013.

The display device 1000 measures the slew rate of the source signal 8003 based on the final count value (S707).

The display device 1000 may obtain the final count value and measure the slew rate of the source signal based on the final count value. For example, if the final count value is small, the voltage level of the source signal 8003 rapidly increases, so the source signal 8003 may have a high slew rate. For another example, when the final count value is large, the voltage level of the source signal 8003 gradually increases, so the source signal 8003 may have a low slew rate.

The driving controller 1050 may determine whether there is a difference between the predetermined slew rate and the slew rate measured for the source signal. If the predetermined slew rate is greater than the slew rate measured for the source signal, the driving controller 1050 may control the voltage generator 1060 to reduce the voltage provided to the channel amplifiers 1021 and 1031. If the predetermined slew rate is smaller than the slew rate measured for the source signal, the driving controller 1050 may control the voltage generator 1060 to increase the voltage provided to the channel amplifiers 1021 and 1031.

A display device can use a channel amplifier positioned on a source lines to measure the DC level and slew rate of the source signal of an adjacent source line. Typically, the source lines are operating in driving mode while measuring, which can make it measuring the DC level and slew rate of the source signal difficult. In other words, it may not be possible to perform tests on source signals in real time when the display device 1000 is driven.

Figure 9:
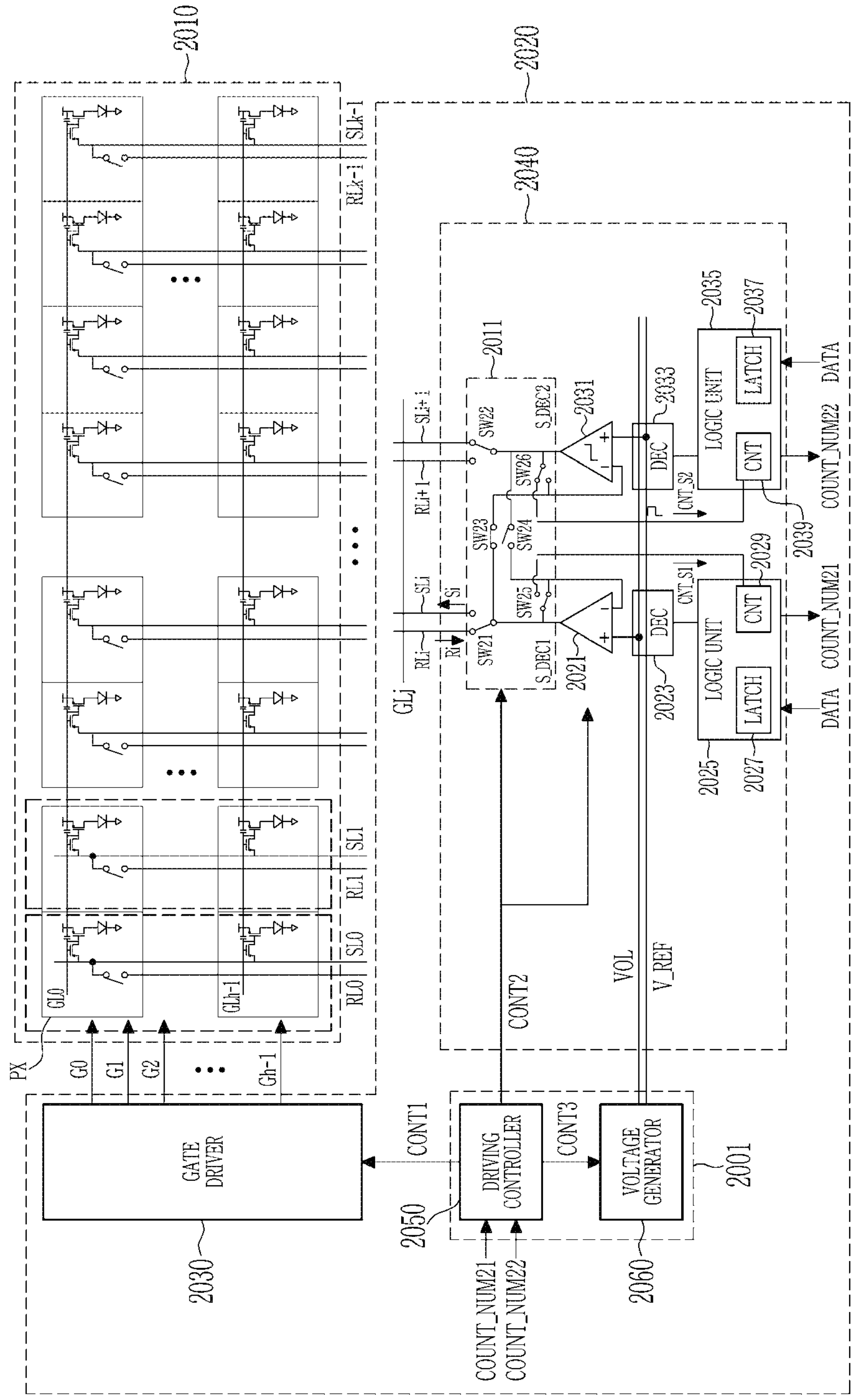
FIG. 9 is a diagram showing an example of a display device.

FIG. 9 is a diagram showing an example of a display device.

As shown in FIG. 9, a display device 2000 includes a pixel array 2010 and a display driving circuit 2020. The display driving circuit 2020 includes a gate driver 2030, a source driver 2040, a driving controller 2050, and a voltage generator 2060. The configuration including the driving controller 2050 and the voltage generator 2060 may be referred to as a main logic 2001. The main logic 2001 may further include a memory storing arbitrary data for controlling the configuration within the display device 2000. However, the present disclosure is not limited thereto, and the memory may be positioned outside of the display device 2000.

The pixel array 2010 may include a plurality of pixels PX. The pixel array 2010 may include the plurality of gate lines GL0, . . . , GLh−1 connected to the plurality of pixels PX, a plurality of source lines SL0, . . . , SLk−1, and a plurality of return lines RL0, . . . , RLk−1 connected to each of the plurality of source lines SL0, . . . , SLk−1.

The gate driver 2030 may transmit gate signals G0, . . . , Gh−1 to the plurality of gate lines GL0, . . . , GLh−1 based on the first control signal CONT1 received from the driving controller 2050.

The driving controller 2050 may drive the display device 2000 in a plurality of modes. For example, when the display device 2000 operates in a driving mode, the driving controller 2050 may generate the first control signal CONT1, the second control signal CONT2, and the third control signal CONT3 corresponding to the driving mode. In this case, the second control signal CONT2 may be a signal that controls a plurality of switches SW21 to SW26 within a selector 2011.

For another example, when the display device 2000 operates in a test mode, the driving controller 2050 may generate the first control signal CONT1, the second control signal CONT2, and the third control signal CONT3 corresponding to the test mode. In some implementations, the driving controller 2050 may measure the DC level and slew rate of the source signal Si output through the source line SLi through the return line RLi connected to the target source line SLi. The plurality of return lines RL may be connected to each of the plurality of source lines SL through a switch.

Specifically, the plurality of source lines SL within the pixel array 2010 may include a first test mode in which a 2n−1th (wherein n is a natural number greater than 1) disposed source line operates in a driving mode and a 2nth disposed source line operates in a comparator mode, and a second test mode in which a 2nth disposed source line operates in a driving mode and a 2n-1th (wherein n is a natural number greater than 1) disposed source line operates in a comparator mode.

When the display device 2000 is operating in the first test mode, the driving controller 2050 may generate the first control signal CONT1 corresponding to the first test mode, the second control signal CONT2 corresponding to the first test mode, and the third control signal CONT3 corresponding to the first test mode.

When the display device 2000 operates in the second test mode, the driving controller 2050 may generate the first control signal CONT1 corresponding to the second test mode, the second control signal CONT2 corresponding to the first test mode, and the third control signal CONT3 corresponding to the first test mode.

The voltage generator 2060 may generate various voltages required to drive the display device 2000 under the control of the driving controller 2050. For example, the voltage generator 2060 may include the plurality of voltages VOL and the reference voltage V_REF including a plurality of gray scale voltages.

The source driver 2040 may include logic units 2025 and 2035, decoders 2023 and 2033, channel amplifiers 2021 and 2031, and the selector 2011.

Unless otherwise specified, the description of the logic units 1025 and 1035, the decoders 1023 and 1033, and the channel amplifiers 1021 and 1031 described with reference to FIG. 3 may be applied to the logic units 2025 and 2035, the decoders 2023 and 2033, and the channel amplifiers 2021 and 2031.

The selector 2011 may be connected to the first channel amplifier 2021 and the second channel amplifier 2031, and may be connected to the return lines RLi and RLi+1 each connected to two adjacent source lines SLi and SLi+1.

The selector 2011 may include first to sixth switches SW21, SW22, SW23, SW24, SW25, and SW26. The selector 2011 may control the connection relationship between the plurality of switches SW21 to SW26 within the selector 2011 based on the second control signal CONT2 received from the driving controller 2050. Specifically, the first switch SW21 may connect the output terminal of the first channel amplifier 2021 and the first source line SLi or connect the first return line RLi. The second switch SW22 may connect the output terminal of the second channel amplifier 2031 and the second source line SLi+1 or connect the second return line RLi+1. The third switch SW23 may be connected to one end of the first switch SW21 (e.g., the output terminal of the first channel amplifier 2021) and the first input terminal of the second channel amplifier 2031. The fourth switch SW24 may be connected to one end of the second switch SW22 (e.g., the output terminal of the second channel amplifier 2031) and the first input terminal of the first channel amplifier 2021. The fifth switch SW25 may connect one end of the first switch SW12 (e.g., the output terminal of the first channel amplifier 2021) and the logic unit 2025 according to the second control signal CONT2 or connect one end of the second switch SW12 and the first input terminal of the first channel amplifier 2021. The sixth switch SW26 may connect one end of the first switch SW22 (e.g., the output terminal of the second channel amplifier 2031) and the logic unit 2035 according to the second control signal CONT2 or connect one end of the second switch SW22 and the first input terminal of the second channel amplifier 2031. In FIG. 3, the first switch SW21, the second switch SW22, the fifth switch SW25, and the sixth switch SW26 are each shown as one SPDT switch, but the present disclosure is not limited thereto. In some implementations, each of the first switch SW21, the second switch SW22, the fifth switch SW25, and the sixth switch SW26 may be implemented as two switches.

When the display device 2000 operates in a driving mode, the driving controller 2050 may generate the second control signal CONT2 corresponding to the driving mode and transmit the second control signal CONT2 to the selector 2011, as described above. Based on the second control signal CONT2 corresponding to the driving mode, the first switch SW21 may connect the output terminal of the first channel amplifier 2021 and the first source line SLi, and the second switch SW22 may connect the output terminal of the second channel amplifier 2031 and the second source line SLi+1. The third switch SW23, the fourth switch SW24, the fifth switch SW25, and the sixth switch SW26 may be turned off. Accordingly, the selector 2011 may receive the first source signal Si from the first channel amplifier 2021 and transmit the first source signal Si to the source line SLi and may receive the second source signal Si+1 from the second channel amplifier 2031 and transmit the second source signal Si+1 to the source line SLi+1.

When the display device 2000 operates in a test mode, the driving controller 2050 may generate the second control signal CONT2 corresponding to the test mode and transmit the second control signal CONT2 to the selector 2011, as described above.

For example, when the display device 2000 is operating in the first test mode, the second control signal CONT2 may be a signal that controls the selector 1011 to output the source signal Si to the corresponding source line SLi and controls the selector 2022 to transmit the source signal Si to the first input end of the channel amplifier 2021 connected to the source line SLi.

In the case of the first test mode, based on the second control signal CONT2 corresponding to the first test mode, the first switch SW21 may be connected to the first return line RLi, the second switch SW22 may be connected to the second source line SLi+1, the third switch SW23 may be turned on, the fourth switch SW24 may be turned off, the fifth switch SW25 may connect one end of the first switch SW21 and the first input terminal of the first channel amplifier 2021, and the sixth switch SW26 may connect the output terminal of the second channel amplifier 2031 and the logic unit 2035. Accordingly, the selector 2011 may receive the first return signal Ri from the first channel amplifier 2021 and transmit the first return signal Ri to the first input terminal of the second channel amplifier 2031 through the third switch SW23. The second channel amplifier 2031 may compare the first return signal Ri input to the first input terminal and the reference voltage received from the second decoder 2033, and transmit the comparison result to the logic unit 2035 through the sixth switch SW26.

In some implementations, the return signal Ri input to the first input terminal of the second channel amplifier 2031 through the return line RLi may be a signal from a corresponding source line SLi that has been transmitted to the pixel spaced far away from the source driver 2040 through the plurality of gate lines GL and then returned.

In this case, the switch connecting the return line RLi and the source line SLi may be turned on. Since the return signal Ri is a signal that is transmitted through a plurality of gate lines GL and then returns again, the return signal Ri may be different from the source signal Si output from the output terminal of the first channel amplifier 2021. In some implementations, the first input terminal of the channel amplifier may be an inverting input terminal of the channel amplifier, and the second input terminal may be a non-inverting input terminal of the channel amplifier.

The third control signal CONT3 may be a signal that controls the voltage generator 2060 to transmit a plurality of gray scale voltages to the decoder 2023 as the plurality of voltages VOL and the reference voltage V_REF to the decoder 2033. In this case, the reference voltage V_REF may be input to the second channel amplifier 2031 through the decoder 2023.

For another example, in the case of the second test mode, based on the second control signal CONT2 corresponding to the second test mode, the first switch SW21 may be connected to the first source line SLi, the second switch SW22 may be connected to the second source line RLi+1, the third switch SW23 may be turned off, the fourth switch SW24 may be turned on, the fifth switch SW25 may connect the output terminal of the first channel amplifier 2021 and the logic unit 2025, and the sixth switch SW26 may connect the output terminal of the second channel amplifier 2031 and the first input terminal of the second channel amplifier 2031. Accordingly, the selector 2011 may receive the second return signal Ri+1 from the second channel amplifier 2031 and transmit the second return signal Ri+1 to the first input terminal of the first channel amplifier 2021 through the fourth switch SW24. The first channel amplifier 2021 may compare the second return signal Ri+1 input to the first input terminal and the reference voltage received from the first decoder 2023, and transmit the comparison result to the logic unit 2025 through the fifth switch SW25.

The second control signal CONT2 may be a signal that controls the selector 2011 to output the source signal Si+1 to the source line SLi+1 and controls the selector 2011 to transmit the source signal Si+1 as the return signal RLi+1 to the first input end of the channel amplifier 2021 through the return line RLi+1 connected to the source line SLi+1. The third control signal CONT3 may be a signal that controls the voltage generator 2060 to transmit a plurality of gray scale voltages to the second decoder 2033 as the plurality of voltages VOL and the reference voltage V_REF to the first decoder 2023. In this case, the reference voltage V_REF may be input to the first channel amplifier 2021 through the first decoder 2023.

Figure 10:
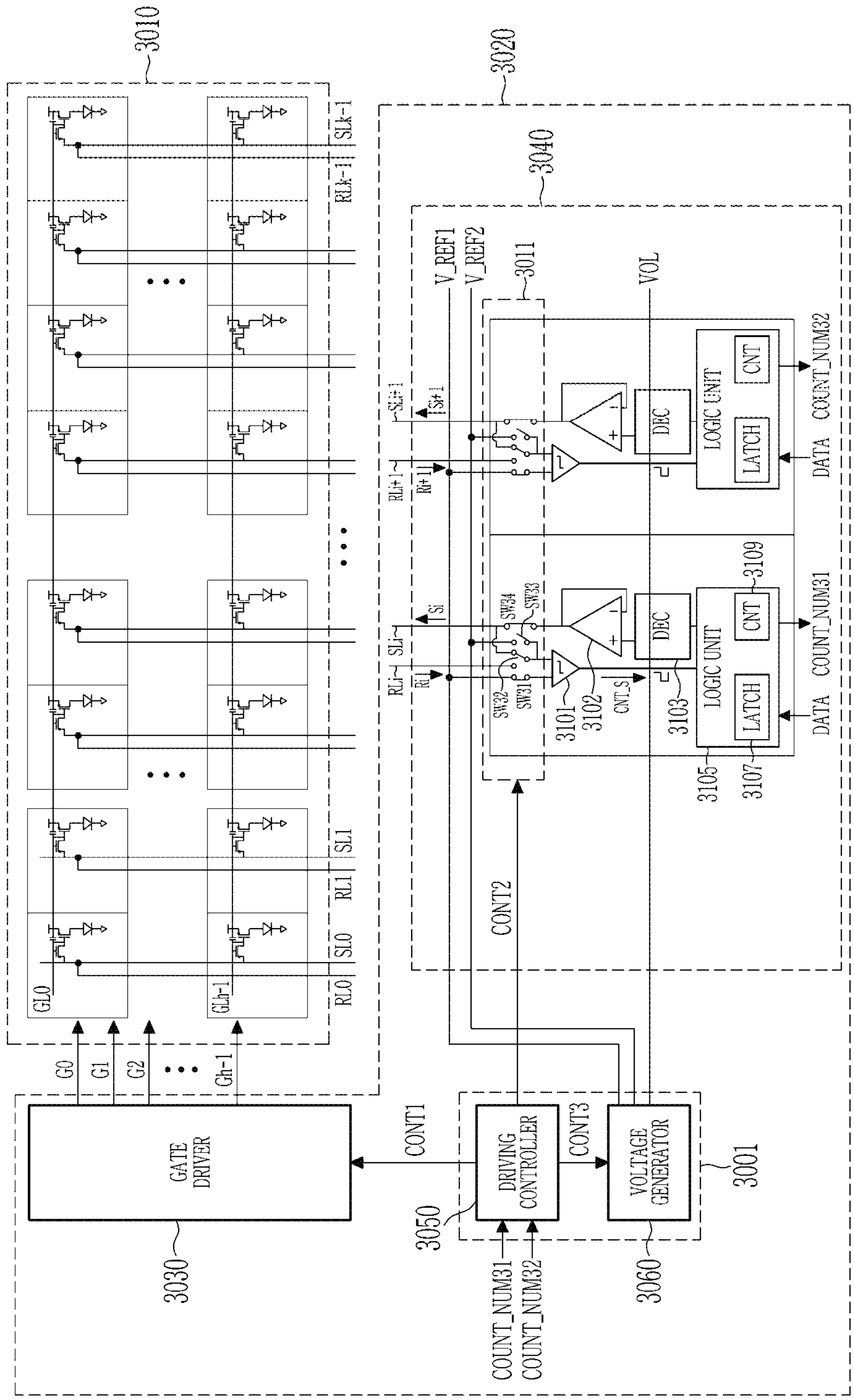
FIG. 10 is a diagram showing an example of a display device.

FIG. 10 is a diagram showing an example of a display device.

As shown in FIG. 10, a display device 3000 includes a pixel array 3010 and a display driving circuit 3020. The display driving circuit 3020 includes a gate driver 3030, a source driver 3040, a driving controller 3050, and a voltage generator 3060. A configuration including the driving controller 3050 and the voltage generator 3060 may be referred to as a main logic 3001. The main logic 3001 may further include a memory storing arbitrary data for controlling the configuration within the display device 3000. However, the present disclosure is not limited thereto, and the memory may be positioned outside of the display device 3000.

The pixel array 3010 may include a plurality of pixels PX. The pixel array 3010 may include the plurality of gate lines GL0, . . . , GLh−1 connected to the plurality of pixels PX, a plurality of source lines SL0, . . . , SLk−1, and a plurality of return lines RL0, . . . , RLk−1 connected to each of the plurality of source lines SL0, . . . , SLk−1.

The gate driver 3030 may transmit gate signals G0, . . . , Gh−1 to the plurality of gate lines GL0, . . . , GLh−1 based on the first control signal CONT1 received from the driving controller 3050.

The driving controller 3050 may drive the display device 3000 in a plurality of modes. For example, when the display device 3000 operates in a driving mode, the driving controller 3050 may generate the first control signal CONT1, the second control signal CONT2, and the third control signal CONT3 corresponding to the driving mode. In this case, the second control signal CONT2 may be a signal that controls a plurality of switches SW31 to SW34 within a selector 3011. The third control signal CONT3 may be a signal that controls the voltage generator 3060 to generate a voltage provided to the source driver 3040.

For another example, when the display device 3000 operates in a test mode, the driving controller 3050 may generate the first control signal CONT1, the second control signal CONT2, and the third control signal CONT3 corresponding to the test mode. In some implementations, the driving controller 3050 may measure the DC level and slew rate of the source signal Si output through the source line SLi through the return line RLi connected to the target source line SLi.

When the display device 3000 operates in the test mode, the driving controller 3050 may generate the first control signal CONT1 corresponding to the test mode, the second control signal CONT2 corresponding to the test mode, and the third control signal CONT3 corresponding to the test mode. For example, when the display device 3000 is operating in the test mode, the second control signal CONT2 may be a signal that controls the selector 3011 to output the source signal Si to the corresponding source line SLi and controls the selector 3011 to transmit the return signal Ri corresponding to the source signal Si to a comparator 3101.

The third control signal CONT3 may be a signal that controls the voltage generator 3060 to generate a plurality of gray scale voltages as the plurality of voltages VOL and transmit the plurality of gray scale voltages to a decoder 3103 and generate reference voltages V_REF1 and V_REF2 and transmit the reference voltages V_REF1 and V_REF2 to the comparator 3101.

The voltage generator 3060 may generate various voltages required to drive the display device 3000 under the control of the driving controller 3050. For example, the voltage generator 3060 may generate a plurality of voltages VOL and a plurality of reference voltages V_REF1 and V_REF2 including a plurality of gray scale voltages.

The source driver 3040 may include a logic unit 3105, the decoder 3103, a channel amplifier 3102, the comparator 3101, and the selector 3011.

The source driver 1040 may convert the image data DATA received from the driving controller 3050 into the source signal Si and output the source signal Si through the second source line (SLi, i is an integer greater than 0 and less than or equal to k−2). The source driver 3040 may generate a count value COUNT_NUM31 based on the DC level and slew rate measured based on the return signal Ri corresponding to the source signal Si and the reference voltage.

The logic unit 3105 may receive image data DATA from the driving controller 3050 and transmit the count value COUNT_NUM31 to the driving controller 3050.

The logic unit 3105 may include a latch 3107 and a counter 3109.

The latch 3107 may receive image data DATA from the driving controller 3050. The latch 3107 may sample and store image data DATA under the control of the driving controller 3050. The latch 3107 may transmit sampled image data to the decoder 3103. In some implementations, the latch 3107 may include a sampling circuit that samples data and a holding latch that stores data sampled by the sampling circuit.

The counter 3109 generates a first count value COUNT_NUM31 based on a counter input signal CNT_S received from the comparator 3101. Here, the counter input signal CNT_S may be a signal indicating the comparison result of comparing the source signal Si and the reference voltage or the comparison result of comparing the return signal Ri corresponding to the source signal Si and the reference voltage. The counter 3109 may transmit the generated count value COUNT_NUM31 to the driving controller 3050.

In FIG. 10, the latch 3107 and the counter 3109 are shown as being included in the logic unit 3105. However, the present disclosure is not limited thereto, and the latch 3107 and the counter 3109 may be configured in separate configurations.

The decoder 3103 may receive sampled image data from the latch 3107 and receive the plurality of voltages VOL from the voltage generator 3060. The plurality of voltages VOL may include gamma voltages corresponding to various levels of luminances of the display device 3000. In some implementations, the decoder 1023 may select one of the plurality of voltages VOL in response to sampled image data. The decoder 3103 may output the selected gamma voltage(s) to the channel amplifier 3102. For example, decoder 3103 may be implemented as a digital-to-analog converter.

The channel amplifier 3102 may receive the gamma voltage selected from the decoder 3103, amplify the gamma voltage selected by the decoder 3103 in response to the second control signal CONT2 received from the driving controller 3050, and transmit the selected gamma voltage to the selector 3011 as the source signal Si.

The selector 3011 may be connected to the channel amplifier 3102, the comparator 3101, the source line SLi, the return line RLi, and the voltage generator 3060. The selector 3011 may include first to fourth switches SW31, SW32, SW33, and SW34. The selector 3011 may control the connection relationship between the plurality of switches SW31 to SW34 within the selector 3011 based on the second control signal CONT2 received from the driving controller 3050. Specifically, the first switch SW31 may be connected between a voltage line providing the first reference voltage V_REF1 and the first input terminal of the comparator 3101. The second switch SW32 may connect the second input terminal of the comparator 3101 and the return line RLi or connect the return line RLi and the source line SLi. The third switch SW33 may be connected between the second input terminal of the comparator 3101 and a voltage line providing the second reference voltage V_REF2. The fourth switch SW34 may be connected between the output terminal of the channel amplifier 3102 and the source line SLi. In FIG. 10, each of the second switches SW32 are shown as one SPDT switch, but the present disclosure is not limited thereto. For example, the second switch SW32 may be implemented as two switches.

When the display device 3000 operates in a driving mode, the driving controller 3050 may generate the second control signal CONT2 corresponding to the driving mode and transmit the second control signal CONT2 to the selector 3011, as described above.

Based on the second control signal CONT2 corresponding to the driving mode, the first switch SW31 and the fourth switch SW32 may be turned on, the second switch SW32 may connect the comparator 3101 and the return line RLi or the source line SLi, and the third switch SW33 may be turned off. Accordingly, the selector 3011 may receive the source signal Si from the channel amplifier 3102 and transmit the source signal Si to the source line SLi through the fourth switch SW34.

The display device 3000 may operate in a test mode at the same time as operating in a driving mode. For example, when the display device 3000 operates in the DC level measurement mode, the first switch SW31 and the fourth switch SW34 may be turned on, the second switch SW32 may connect the comparator 3101 and the return line RLi or the source line SLi, and the third switch SW33 may be turned off. In some implementations, the first reference voltage V_REF1 may be a sawtooth waveform voltage used to measure the DC level of the source signal Si. When the display device 3000 operates in the DC level measurement mode, the driving controller 3050 may compare the return signal Ri or the source signal Si and the first reference voltage V_REF1.

When comparing the first reference voltage V_REF1 and the second reference voltage V_REF2 to measure the DC level of the source signal Si, the first switch SW31 may connect the comparator 3101 and the first reference voltage V_REF1, and the third switch SW33 may be turned on. Accordingly, the comparator 3101 may compare the first reference voltage V_REF1 and the second reference voltage V_REF2.

For another example, when the display device 3000 operates in the slew rate measurement mode, the first switch SW31 and the fourth switch SW34 may be turned on, the second switch SW32 may connect the comparator 3101 and the return line RLi or the source line SLi, and the third switch SW33 may be turned off. In some implementations, the second reference voltage V_REF2 may be a DC voltage used to measure the slew rate of the source signal Si. When the display device 3000 operates in the slew rate measurement mode, the driving controller 3050 may compare the return signal Ri and the second reference voltage V_REF2. When the display device 3000 operates in the slew rate measurement mode, the second switch SW32 may be set to connect the comparator 3101 and the return line RLi to accurately measure the change in the source signal Si.

The source driver 3040 includes a plurality of comparators, and each of the plurality of comparators is connected to the plurality of source lines SLi and each of the plurality of return lines RLi corresponding to the plurality of source lines Si. Therefore, the display device 3000 may measure the DC level or slew rate of the source signal Si even when operating in driving mode.

Accordingly, the display device 3000 may correct image data in real time based on the DC level or slew rate of the source signal Si measured while the display device 3000 operates in a driving mode. In some implementations, the display device 3000 may also correct the image signal (IS in FIG. 1) in real time based on the DC level or slew rate of the source signal Si measured while the display device 3000 operates in a driving mode.

Figure 11:
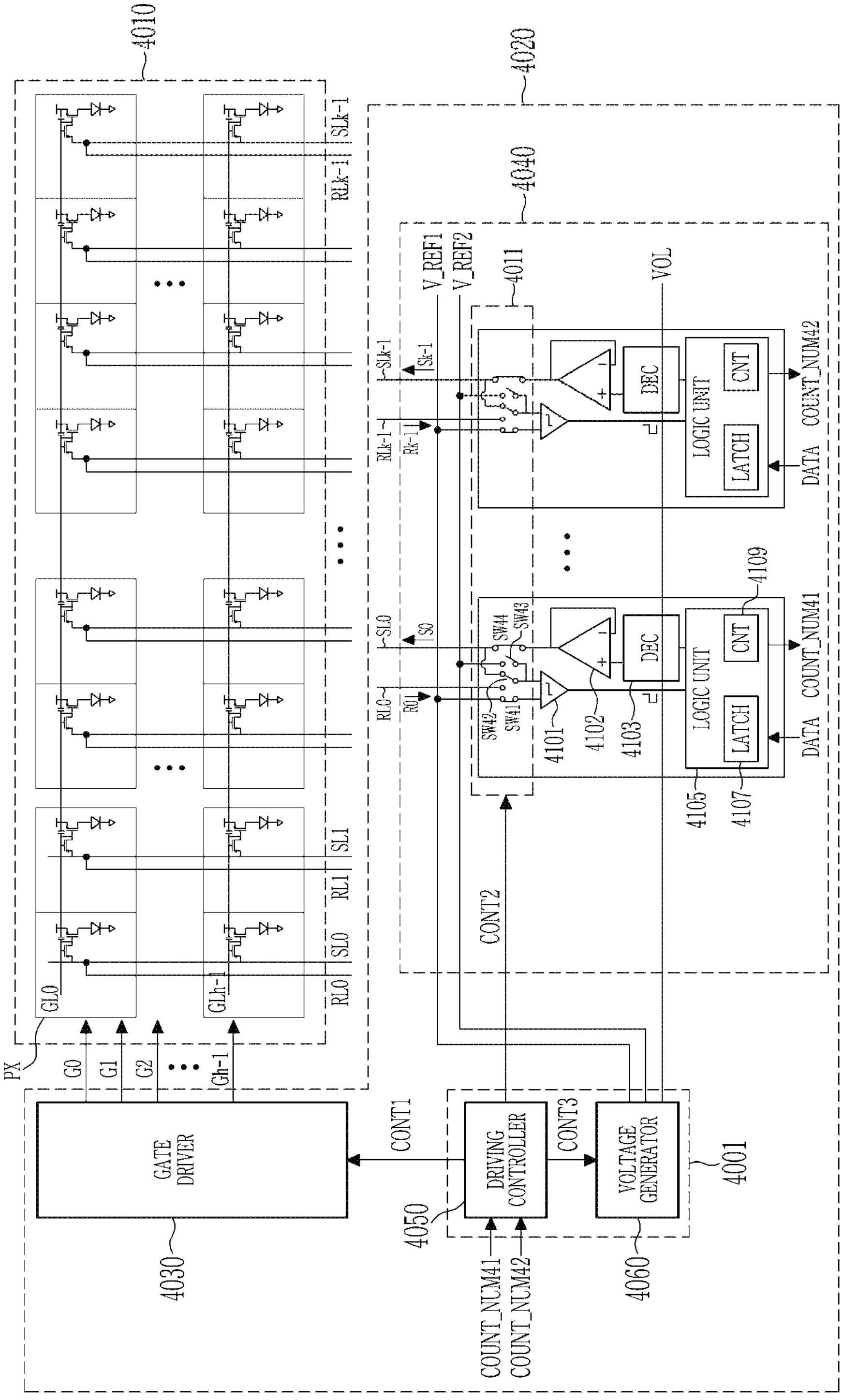
FIG. 11 is a diagram showing an example of a display device.

FIG. 11 is a diagram showing an example of a display device.

As shown in FIG. 11, a display device 4000 includes a pixel array 4010 and a display driving circuit 4020. The display driving circuit 4020 may include a gate driver 4030, a source driver 4040, a driving controller 4050, and a voltage generator 4060. The configuration including the driving controller 4050 and the voltage generator 4060 may be referred to as the main logic 201. A main logic 4001 may further include a memory storing arbitrary data for controlling the configuration within the display device 4000. However, the present disclosure is not limited thereto, and the memory may be positioned outside of the display device 4000.

Unless otherwise specified, the display device 4000 may be similar to the display device 3000 described with reference to FIG. 10.

As shown in FIG. 11, the source driver 4040 may have comparators connected to only source line SL0 and source line SLk−1 positioned at both ends of the plurality of source lines SL0, . . . , SLk−1 within the pixel array 4010.

As the number of source lines increases, the load applied to the display panel may further increase. Accordingly, in order to reduce the load on the source line SL connected to the pixel array 4010, a representative characteristic of the source signals Si, Sk−1 provided to both ends of the pixel array 4010 can be measured. However, the present disclosure is not limited thereto, and the configuration of the source driver including a comparator to measure the characteristics of the source signal Si may be disposed on any source line SL.

Figure 12:
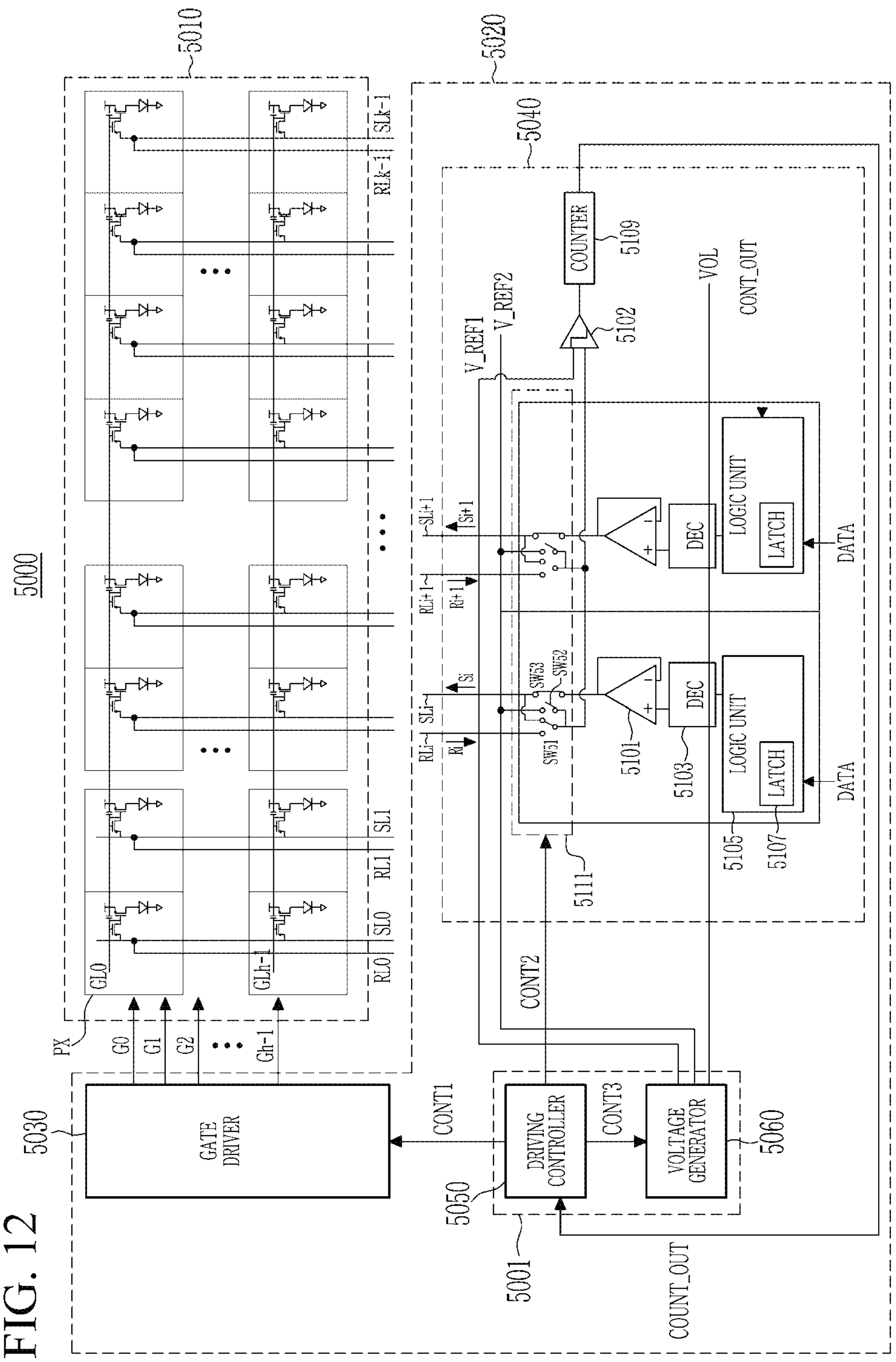
FIG. 12 is a diagram showing an example of a display device.

FIG. 12 is a diagram showing unless otherwise specified a display device.

As shown in FIG. 12, a display device 5000 includes a pixel array 5010 and a display driving circuit 5020. The display driving circuit 5020 includes a gate driver 5030, a source driver 5040, a driving controller 5050, and a voltage generator 5060. The configuration including the driving controller 5050 and the voltage generator 5060 may be referred to as the main logic 201. A main logic 201 may further include a memory storing arbitrary data for controlling the configuration within the display device 5000. However, the present disclosure is not limited thereto, and the memory may be positioned outside of the display device 5000.

The pixel array 5010 may include a plurality of pixels PX. The pixel array 5010 may include the plurality of gate lines GL0, . . . , GLh−1 connected to the plurality of pixels PX, the plurality of source lines SL0, . . . , SLk−1, and the plurality of return lines RL0, . . . , RLk−1 connected to each of the plurality of source lines SL0, . . . , SLk−1.

The gate driver 5030 may transmit the gate signals G0, . . . , Gh−1 to the plurality of gate lines GL0, . . . , GLh−1 based on the first control signal CONT1 received from the driving controller 5050.

The driving controller 5050 may drive the display device 5000 in a plurality of modes. For example, when the display device 5000 operates in a driving mode, the driving controller 5050 may generate the first control signal CONT1, the second control signal CONT2, and the third control signal CONT3 corresponding to the driving mode. In this case, the second control signal CONT2 may be a signal that controls a plurality of switches SW51 to SW53 within a selector 5111. The third control signal CONT3 may be a signal that controls the voltage generator 5060 to generate a voltage provided to the source driver 5040.

For example, when the display device 5000 operates in a test mode, the driving controller 5050 may generate the first control signal CONT1, the second control signal CONT2, and the third control signal CONT3 corresponding to the test mode. In some implementations, the driving controller 5050 may measure the DC level and slew rate of the source signal Si output through the source line SLi through the return line RLi connected to the target source line SLi.

When the display device 5000 operates in the test mode, the driving controller 5050 may generate the first control signal CONT1 corresponding to the test mode, the second control signal CONT2 corresponding to the test mode, and the third control signal CONT3 corresponding to the test mode. For example, when the display device 5000 is operating in the test mode, the second control signal CONT2 may be a signal that controls the selector 5111 to output the source signal Si to the corresponding source line SLi and controls the selector 5111 to transmit the return signal Ri corresponding to the source signal Si to a channel amplifier 5101.

The third control signal CONT3 may be a signal that controls the voltage generator 5060 to generate a plurality of gray scale voltages as the plurality of voltages VOL and transmit the plurality of gray scale voltages to a decoder 5103 and generate reference voltages V_REF1 and V_REF2 and transmit the reference voltages V_REF1 and V_REF2 to the channel amplifier 5101.

The voltage generator 5060 may generate various voltages required to drive the display device 5000 under the control of the driving controller 5050. For example, the voltage generator 5060 may generate a plurality of voltages VOL and a plurality of reference voltages V_REF1 and V_REF2 including a plurality of gray scale voltages.

The source driver 5040 may include a channel amplifier 5101, a comparator 5102, a decoder 5103, a logic unit 5105, a counter 5109, and a selector 5111.

The source driver 5040 may convert the image data DATA received from the driving controller 5050 into the source signal Si and output the source signal Si through the second source line (SLi, i is an integer greater than 0 and less than or equal to k−2). The source driver 5040 may generate a count value COUNT_NUM51 based on the DC level and slew rate measured based on the return signal Ri corresponding to the source signal Si and the reference voltage.

The logic unit 5105 may receive image data DATA from the driving controller 5050. The logic unit 5105 may include a latch 5107. The latch 5107 may receive image data DATA from the driving controller 5050. The latch 5107 may sample and store image data DATA under the control of the driving controller 5050. The latch 5107 may transmit sampled image data to the decoder 5103. In some implementations, the latch 5107 may include a sampling circuit that samples data and a holding latch that stores data sampled by the sampling circuit.

The counter 5109 generates a count value COUNT_OUT based on the counter input signal CNT_S received from the comparator 5102. Here, the counter input signal CNT_S may be a signal indicating the comparison result of comparing the source signal Si and the reference voltage or the comparison result of comparing the return signal Ri corresponding to the source signal Si and the reference voltage. The counter 5109 may transmit the generated count value COUNT_OUT to the driving controller 5050. For example, the counter 5109 may transmit the count value COUNT_OUT to the logic unit 5105, and the logic unit 5105 may transmit the count value COUNT_OUT received from the counter 5109 to the driving controller 5050.

The decoder 5103 may receive sampled image data from the latch 5107 and may receive the plurality of voltages VOL from the voltage generator 5060. The plurality of voltages VOL may include gamma voltages corresponding to various levels of luminances of the display device 5000. In some implementations, the decoder 5103 may select one of the plurality of voltages VOL in response to sampled image data. The decoder 5103 may output the selected gamma voltage(s) to the channel amplifier 5101. For example, the decoder 5103 may be implemented as a digital-to-analog converter.

The channel amplifier 5101 may receive the gamma voltage selected from the decoder 5103, amplify the gamma voltage selected by the decoder 5103 in response to the second control signal CONT2 received from the driving controller 5050, and transmit the selected gamma voltage to the selector 5111 as the source signal Si.

The selector 5111 may be connected to the channel amplifier 5101, the comparator 5102, the source line SLi, the return line RLi, and the voltage generator 5060. The selector 5111 may include first to fourth switches SW51, SW52, and SW53. The selector 5111 may control the connection relationship between the plurality of switches SW51 to SW53 within the selector 5111 based on the second control signal CONT2 received from the driving controller 5050. Specifically, the first switch SW51 may connect the first input terminal of the comparator 5102 and the return line RLi or connect the first input terminal of the comparator 5102 and the source line SLi. The second switch SW52 may be connected between the second input terminal of the comparator 5102 and a voltage line providing the second reference voltage V_REF2. The third switch SW53 may be connected between the output terminal of the channel amplifier 5101 and the source line SLi. In FIG. 10, each of the first switches SW51 are shown as one SPDT switch, but the present disclosure is not limited thereto. In some implementations, the first switch SW51 may be implemented as two switches.

When the display device 5000 operates in a driving mode, the driving controller 5050 may generate the second control signal CONT2 corresponding to the driving mode and transmit the second control signal CONT2 to the selector 5111, as described above.

Based on the second control signal CONT2 corresponding to the driving mode, the first switch SW51 may connect the channel amplifier 5101 and the return line RLi or the source line SLi, the second switch SW52 may be turned off, and the third switch SW53 may be turned on. Accordingly, the selector 5111 may receive the source signal Si from the channel amplifier 5101 and transmit the source signal Si to the source line SLi through the third switch SW53.

The display device 5000 may operate in a test mode at the same time as operating in a driving mode. For example, when the display device 5000 operates in the DC level measurement mode, the first switch SW51 may connect the channel amplifier 5101 and the return line RLi or the source line SLi, the second switch SW52 may be turned off, and the third switch SW53 may be turned on. In some implementations, the first reference voltage V_REF1 may be a sawtooth waveform voltage used to measure the DC level of the source signal Si. When the display device 5000 operates in the DC level measurement mode, the driving controller 5050 may compare the return signal Ri or the source signal Si and the first reference voltage V_REF1.

When comparing the first reference voltage V_REF1 and the second reference voltage V_REF2 to measure the DC level of the source signal Si, the first switch SW31 may be turned off, the second switch SW52 may be connected to the second reference voltage V_REF2, and the third switch SW53 may be turned on or turned off. Accordingly, the comparator 3101 may compare the first reference voltage V_REF1 and the second reference voltage V_REF2.

For example, when the display device 5000 operates in the slew rate measurement mode, the first switch SW51 may connect the channel amplifier 5101 and the return line RLi or the source line SLi, the second switch SW52 may be turned off, and the third switch SW53 may be turned on. In some implementations, the second reference voltage V_REF2 may be a DC voltage used to measure the slew rate of the source signal Si. When the display device 5000 operates in the slew rate measurement mode, the first switch SW51 may be set to connect the comparator 3101 and the return line RLi to accurately measure the change in the source signal Si.

The source driver 5040 includes a comparator connected to the plurality of source lines SL and may measure the DC level or slew rate of the source signal Si for all source lines SL through the comparator 5102 by controlling the source signal Si input into the comparator 5102.

Figure 13:
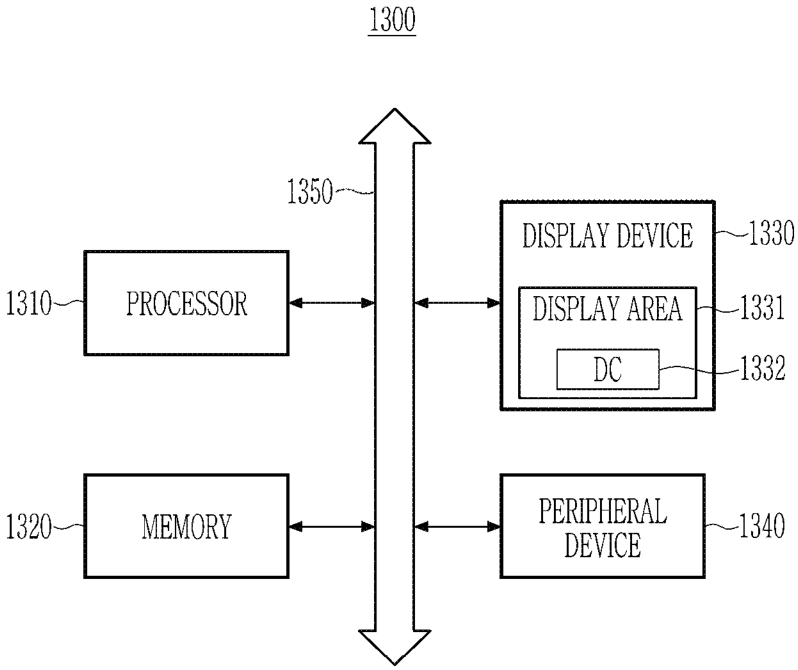
FIG. 13 is a diagram of an example of a display system.

FIG. 13 is a diagram of an example of a display system.

Referring to FIG. 13, a display system 1300 includes a processor 1310, a memory 1320, a display device 1330, and a peripheral device 1340 that are electrically connected to a system bus 1350.

The processor 1310 controls the input and output of data from the memory 1320, the display device 1330, and the peripheral device 1340, and may perform image processing of image data transmitted between the corresponding devices.

The memory 1320 may include volatile memory such as dynamic random access memory (DRAM) and/or non-volatile memory such as flash memory. The memory 1320 may include DRAM, phase-change random access memory (PRAM), magnetic random access memory (MRAM), resistive random access memory (ReRAM), ferroelectric random access memory (FRAM), NOR flash memory, NAND flash memory, and fusion flash memory (for example, memory combined with static random access memory (SRAM) buffer and NAND flash memory and NOR interface logic).

The memory 1320 may store image data obtained from the peripheral device 1340 or an image signal processed by the processor 1310.

The display device 1330 includes a display panel 1331 and may display image data transmitted through the system bus 1350 on the display panel 1331. The display panel 1331 may be a display panel. The display panel 1331 may include a driving circuit 1332. The driving circuit 1332 may measure the DC level for the source signal provided from the driving circuit 1332 to the display panel 1331 and the slew rate of the source signal. Thereafter, the driving circuit 1332 may modify the image data based on the measured DC level and slew rate.

The peripheral device 1340 may be a device that converts moving images or still images, such as a camera, scanner, or webcam, into electrical signals. Image data obtained through the peripheral device 1340 may be stored in the memory 1320 or displayed on the display panel 1331 in real time.

The display system 1300 may be provided in a mobile electronic product such as a smartphone, but is not limited thereto, and may be provided in various types of electronic products that display images.

While examples of the present disclosure have been described in detail, it is to be understood that the disclosure is not limited to the disclosed examples, but is intended to cover various modifications and equivalent arrangements included within the spirit and scope of the appended claims.

In some implementations, each constituent element or combination of two or more constituent elements described with reference to FIGS. 1 to 13 may be implemented as a digital circuit, a programmable or non-programmable logic device or array, or an application specific integrated circuit (ASIC), and the like.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While the embodiments of the present disclosure have been described in detail, it is to be understood that the disclosure is not limited to the disclosed implementations, but on the contrary, is intended to cover various modifications and equivalent arrangements included within the spirit and scope of the appended claims.

What is claimed is:

1. A display device, comprising:

a pixel array including a plurality of pixels connected to a plurality of source lines;

a first channel amplifier connected to a first source line among the plurality of source lines and configured to output a first source signal corresponding to the first source line;

a second channel amplifier connected to a second source line positioned adjacent to the first source line; and a selector connected to the first source line and configured to transmit a first return signal corresponding to the first source signal to the second channel amplifier.

2. The display device of claim 1, wherein the second channel amplifier is further configured to receive a reference voltage and the first return signal and output a first comparison result of the first return signal and the reference voltage; and wherein the display device comprises:

a voltage generator configured to generate the reference voltage; and a first counter configured to generate a first count value based on the first comparison result.

3. The display device of claim 2, wherein the selector comprises:

a first switch configured to connect an output terminal of the first channel amplifier to either a first input terminal of the first channel amplifier or the first counter;

a second switch configured to connect the output terminal of the first channel amplifier and the first input terminal of the second channel amplifier;

a third switch configured to connect the output terminal of the first channel amplifier and the first input terminal of the first channel amplifier; and a fourth switch configured to connect an output terminal of the second channel amplifier and the first input terminal of the first channel amplifier.

4. The display device of claim 2, wherein the second channel amplifier is configured to output a second source signal corresponding to the second source line, wherein the first channel amplifier is configured to receive a second return signal corresponding to the second source signal, wherein the first channel amplifier is configured to output a second comparison result of the reference voltage and the second source signal, wherein the selector is further connected to the second source line and is configured to transmit the second return signal to the first channel amplifier, and wherein the display device further comprises a second counter configured to generate a second count value based on the second comparison result.

5. The display device of claim 4, wherein the selector comprises:

a first switch configured to connect an output terminal of the first channel amplifier to either a first input terminal of the first channel amplifier or the first counter;

a second switch configured to connect the output terminal of the first channel amplifier and the first input terminal of the second channel amplifier;

a third switch configured to connect an output terminal of the second channel amplifier and the first input terminal of the second channel amplifier or the second counter; and a fourth switch configured to connect the output terminal of the second channel amplifier and the first input terminal of the first channel amplifier.

6. The display device of claim 5, wherein, when the second switch is turned on, the fourth switch is turned off, the first switch is configured to connect the output terminal of the first channel amplifier to the first input terminal of the first channel amplifier, the third switch is configured to connect the output terminal of the second channel amplifier and the second counter, and the second channel amplifier is configured to output the first comparison result.

7. The display device of claim 5, wherein, when the fourth switch is turned on, the second switch is turned off, the first switch is configured to connect the output terminal of the first channel amplifier to the first counter, the third switch is configured to connect the output terminal of the second channel amplifier to the first input terminal of the first channel amplifier, and the first channel amplifier is configured to output the second comparison result.

8. The display device of claim 4, further comprising a driving controller configured to:

receive an image signal from an external source;

generate image data corresponding to the received image signal;

correct image data for the first source signal based on the first count value and the second count value; and generate corrected image data.

9. The display device of claim 8, wherein the reference voltage is a sawtooth waveform, and wherein the driving controller is configured to measure a DC level value for the first source signal based on the first count value and a DC level value for the second source signal based on the second count value.

10. The display device of claim 8, wherein the reference voltage is a DC voltage, and wherein the driving controller is configured to measure a slew rate for the first source signal based on the first count value and a slew rate for the second source signal based on the second count value.

11. The display device of claim 1, further comprising a plurality of return lines connected to each of the plurality of source lines, wherein the selector is configured to receive the first return signal through a first return line connected to the first source line among the plurality of return lines.

12. A display device, comprising:

a pixel array including a plurality of pixels connected to a plurality of source lines;

a voltage generator configured to generate a reference voltage;

a first channel amplifier connected to a first source line and configured to output a first source signal corresponding to a first source line among the plurality of source lines;

a first comparator configured to receive a first return signal corresponding to the first source signal through a first return line among a plurality of return lines connected to each of the plurality of source lines, and to generate a first count value based on a first comparison result of the first return signal and the reference voltage; and a selector configured to connect to the first source line and transmit the first return signal to the first comparator.

13. The display device of claim 12, wherein the selector comprises:

a first switch configured to connect to the first return line or between a first voltage line configured to provide the reference voltage and a first input terminal of the first comparator;

a second switch configured to either connect a second input terminal of the first comparator and the first return line or connect the second input terminal and the first source line; and a third switch configured to connect a second voltage line that is configured to provide the reference voltage and the second input terminal.

14. The display device of claim 13, wherein, when the first switch is turned on, the second switch is configured to connect the second input terminal and the first return line, and wherein, when the third switch is turned off, the first channel amplifier is configured to output the first comparison result.

15. The display device of claim 12, further comprising a driving controller configured to:

receive an image signal from an external source;

generate image data corresponding to the received image signal;

correct image data for the first source signal based on the first count value; and provide corrected image data to a source driver.

16. The display device of claim 12, wherein the first source line is positioned at both ends of the pixel array.

17. A display device, comprising:

a pixel array including a plurality of pixels connected to a plurality of source lines;

a voltage generator configured to generate a reference voltage;

a first channel amplifier connected to a first source line among the plurality of source lines and configured to output a first source signal corresponding to the first source line;

a first comparator connected to the plurality of source lines and a plurality of return lines connected to each of the plurality of source lines, configured to receive a first return signal corresponding to the first source signal through a first return line among the plurality of return lines, and configured to generate a first count value based on a first comparison result of the first return signal and the reference voltage; and a selector connected to the first source line and the first return signal, wherein the selector configured to transmit the first return signal to the first comparator.

18. The display device of claim 17, wherein the selector comprises:

a first switch configured to connect a first input terminal of the first comparator to the first return line or the first source line;

a second switch configured to connect a second input terminal of the first comparator and a voltage line configured to provide the reference voltage; and a third switch configured to connect an output terminal of the first channel amplifier and the first source line.

19. The display device of claim 18, wherein, when the first switch connects the first channel amplifier and the first return line, the second switch is turned off, and wherein, when the third switch is turned on, the first channel amplifier is configured to output the first comparison result.

20. The display device of claim 17, wherein the display device comprises a first counter configured to generate the first count value based on the first comparison result.

* * * * *